(12) United States Patent
Samdani et al.

(10) Patent No.: US 8,396,688 B2
(45) Date of Patent: Mar. 12, 2013

(54) SYSTEMS AND METHODS FOR IMPULSE NOISE CHARACTERIZATION

(75) Inventors: Hemant Kumar Samdani, New Delhi (IN); Kunal Raheja, Noida (IN); Rahul Garg, Faridabad (IN); Amitkumar Mahadevan, Eatontown, NJ (US); Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 326 days.

(21) Appl. No.: 12/348,565

(22) Filed: Jan. 5, 2009

(65) Prior Publication Data

US 2010/0061437 A1    Mar. 11, 2010

Related U.S. Application Data

(60) Provisional application No. 61/094,956, filed on Sep. 7, 2008.

(51) Int. Cl.
 *G06F 17/18*  (2006.01)
 *H04B 15/00*  (2006.01)
 *H04Q 1/20*   (2006.01)
 *G01R 29/26*  (2006.01)

(52) U.S. Cl. ......... 702/180; 375/227; 324/613; 702/191

(58) Field of Classification Search .......... 375/227; 324/613; 702/180, 191
See application file for complete search history.

(56) References Cited

U.S. PATENT DOCUMENTS

| | | | |
|---|---|---|---|
| H001726 H | 5/1998 | Chen | |
| 6,885,730 B1 | 4/2005 | Bremer | |
| 7,027,405 B1 | 4/2006 | Khadavi | |
| 7,031,381 B1 | 4/2006 | Betts | |
| 7,106,833 B2 | 9/2006 | Kerpez | |
| 7,263,174 B2 | 8/2007 | Schmidt | |
| 7,274,746 B2 | 9/2007 | Bailey | |
| 7,720,633 B2 * | 5/2010 | Long et al. .................. | 702/180 |
| 7,787,483 B2 * | 8/2010 | Vanderhaegen et al. ...... | 370/426 |
| 2006/0067388 A1 | 3/2006 | Sedarat | |
| 2007/0230548 A1 | 10/2007 | Van de Wiel et al. | |
| 2008/0069248 A1 * | 3/2008 | Heise et al. .................. | 375/254 |
| 2008/0165838 A1 * | 7/2008 | Vanderhaegen et al. ...... | 375/224 |
| 2008/0165905 A1 * | 7/2008 | Heise et al. .................. | 375/346 |
| 2008/0232444 A1 * | 9/2008 | Tzannes ....................... | 375/219 |
| 2009/0138775 A1 * | 5/2009 | Christiaens et al. .......... | 714/748 |

(Continued)

FOREIGN PATENT DOCUMENTS

WO    WO 2005086405 A2 *    9/2005

OTHER PUBLICATIONS

Peter Adams, BT, Miguel Berg, Ericsson, Rob F.M. van den Brink, TNO, Les Humphrey, BT, edito, Mauro Tilocca, Telecom Italia; Feb. 15, 2008, DTF2.0—Standards participation summary—Re: MUSE TF2 "First Mile Systems"; http://www.ist-muse.org/Deliverables/TF2/MUSE_DTF2.0_v2.pdf.*

(Continued)

*Primary Examiner* — Jonathan C Teixeira Moffat
*Assistant Examiner* — Regis Betsch
(74) *Attorney, Agent, or Firm* — Mark J. Danielson; Pillsbury Winthrop Shaw Pittman LLP

(57) ABSTRACT

Impulse noise from nearby or intense electrical sources can disrupt communications over digital subscriber lines (DSL). The characterization of the nature, timing and length of impulse noise sources present on a DSL loop is a critical first step in mitigating the effect of impulse noise on DSL communications. DSL standards provide histograms for impulse length and inter-arrival time of impulses. These histograms can be used to derive the nature, maximum frequency and other statistics related to impulse noise on a DSL line.

32 Claims, 28 Drawing Sheets

U.S. PATENT DOCUMENTS

2009/0252234 A1* 10/2009 Samdani et al. .............. 375/254

OTHER PUBLICATIONS

Draft Amendment 2 to International Telecommunications Union (ITU-T), "Recommendation G.993.2, Very High Speed Digital Subscriber Line transceivers 2 (VDSL2)," Section 11.4.2.2, pp. 15-20, 2007.

"G.gen: G.vdsl: ADSL: Impulse Noise Monitoring: Performance Requirements," Source: Alcatel-Lucent, Document No. BF-070, Contribution to ITU-T, Bordeaux, France, Dec. 3-7, 2007.

"ADSL: G.ADSL: Virtual Noise is required for ADSL2plus," Source: BT, Document No. RJ-043, Contribution to ITU-T, Red Bank, New Jersey, Oct. 8-12, 2007.

Amitkumar Mahadevan, Julien Pons, and Patrick Duvaut, "Performance and Design of an Impulse Noise Detector for OFDM Systems with Reed-Solomon Erasure-Decoding," Conexant Systems Inc., Submitted to Globecom 2008.

Pramod Varshney et al., "Radar Signal detection and estimation using time—frequency distributions," Syracuse University, NY, Oct. 1995.

Der-Jenq Liu, et al, "Fundamental Frequency Estimation Based on the Joint Time-Frequency Analysis of Harmonic Spectral Structure," IEEE Transactions of Speech and Audio processing, vol. 9, No. 6, Sep. 2001.

Papandreou, et al., "Detection and Estimation of Generalized Chirps Using Time-Frequency Representations," Signals, Systems and Computers, 1994 Conference Record of the Twenty-Eighth Asilomar Conference, vol. 1, Issue 31, Oct.-Nov. 1994 pp. 50-54.

G.ADSL: Amendment 5 to Recommendation G.992.3 and G.992.5 (for consent), Section 8.12.5, pp. 11-18, Geneva, Feb. 2008.

International Search Report and Written Opinion for PCT/US09/55697. Oct. 29, 2009.

Telecommunication Standardization Sector of ITU (International Telecommunication Union). ITU-T G.993.2-Amendment 2, Series G: Transmission Systems and Media, Digital Systems and Networks, Digital sections and digital line system—Access networks [online], Feb. 2008.

* cited by examiner

| Initial offset between noise sources (DMT Symbols) | Number of cases out of 400 test cases (i.e. number of failed cases) where either impulse length was not properly classified | Percentage of Failed Cases |
|---|---|---|
| 0 | 30 | 7.5 |
| 23 | 15 | 3.75 |
| 26 | 19 | 4.75 |
| 36 | 19 | 4.75 |
| 43 | 15 | 3.75 |

FIG. 14

SYSTEMS AND METHODS FOR IMPULSE NOISE CHARACTERIZATION

CROSS-REFERENCE TO RELATED APPLICATION

Under 35 U.S.C. 119, this application claims priority to, and the benefit of, U.S. Provisional Patent Application entitled, "Systems and Methods for Impulse Noise Characterization," having Ser. No. 61/094,956, filed on Sep. 7, 2008, which is incorporated by reference in its entirety.

BACKGROUND OF THE INVENTION

1. Field of the Invention

The present invention relates generally to digital subscriber line (DSL) systems. More particularly, the present invention relates to characterization of impulse noise.

2. Related Art

High-bandwidth systems, including DSL systems use single-carrier modulation as well as multi-carrier modulation schemes. Both DSL and other high-bandwidth systems such as wireless use modulation schemes such as Carrier-less Amplitude and Phase modulation (CAP) and Discrete Multi-tone (DMT) for wired media and Orthogonal Frequency Division Multiplexing (OFDM) for wireless communication. One advantage of such schemes is that they are suited for high-bandwidth application of 2 Mbps or higher upstream (subscriber to provider) and 8 Mbps or higher downstream (provider to subscriber). Quadrature Amplitude Modulation (QAM) utilizes quadrature keying to encode more information on the same frequency by employing waves in the same frequency shifted by 90°, which can be thought of as sine and cosine waves of the same frequency. Since the sine and cosine waves are orthogonal, data can be encoded in the amplitudes of the sine and cosine waves. Therefore, twice as many bits can be sent over a single frequency using the quadrature keying. QAM modulation has been used in voice-band modem specifications, including the V.34.

CAP is similar to QAM. For transmission in each direction, CAP systems use two carriers of identical frequency above the 4 kHz voice band, one shifted 90° relative to the other. CAP also uses a constellation to encode bits at the transmitter and decode bits at the receiver. A constellation encoder maps a bit pattern of a known length to a sinusoid wave of a specified magnitude and phase. Conceptually, a sinusoidal wave can be viewed to be in one-to-one correspondence with a complex number where the phase of the sinusoidal is the argument (angle) of the complex number, and the magnitude of the sinusoidal wave is the magnitude of the complex number, which in turn can be represented as a point on a real-imaginary plane. Points on the real-imaginary plane can have bit patterns associated with them, and this is referred to as a constellation and is known to one of ordinary skill in the art.

DMT modulation, sometimes called OFDM, builds on some of the ideas of QAM but, unlike QAM, it uses more than one constellation encoder where each encoder receives a set of bits that are encoded and outputs sinusoid waves of varying magnitudes and phases. However, different frequencies are used for each constellation encoder. The outputs from these different encoders are summed together and sent over a single channel for each direction of transmission. For example, common DMT systems divide the spectrum from 0 kHz to 1104 kHz into 256 narrow channels called tones (sometimes referred to as bins, DMT tones or sub-channels). These tones are 4.3125 kHz wide. The waveforms in each tone are completely separable from one another. In order to maintain separability, the frequencies of the sinusoidal used in each tone should be multiples of a common frequency known as the fundamental frequency and in addition the symbol period τ, must be a multiple of the period of the fundamental frequency or a multiple thereof. The aggregate bit pattern which comprises the bit patterns mapped to constellations in each of the tones during a symbol period is often referred to as a DMT symbol. For the purposes here, time is often referred to in terms of DMT symbols meaning a symbol period.

The presence of impulse noise can occur in digital subscriber line (xDSL) systems due to electromagnetic interference from such sources as a telephone network, power system, and even from natural phenomena such as thunderstorms and lightning. The presence of impulse noise can significantly limit the reliability of real-time services such as video that can be supported by current generation xDSL systems, for example, VDSL (Very High Speed DSL). The occurrence of impulse noise can cause severe degradation in the DMT symbols received. The degraded DMT symbols resulting from the impulse noise can cause physical layer cyclic redundancy code (CRC) errors and loss of packets in xDSL systems, thereby affecting such triple-play services as IPTV. Therefore, there has been substantial interest in the DSL community recently towards the development and standardization of impulse noise monitoring (INM) schemes.

In particular, the classification of impulse sources on a particular line is of great importance to the service provider so that the appropriate impulse noise protection (INP) approach can be taken. The typical classes of impulse noise observed on a line are repetitive electrical impulse noise (REIN), prolonged electrical impulse noise (PEIN), and a single high impulse noise event (SHINE). Electromagnetic interference from telephone networks, fluorescent lights, power supply units of TVs or PCs, video recorders, electronic transformers, etc. in the vicinity of a particular line, can cause noise impulses having a repetitive character often proportional to the frequency of the power lines (60 Hz in the U.S. and 50 Hz in Europe). This is an example of REIN. Lightning would be an example a source of SHINE. Certain household appliances often have a prolonged electrical interference and are periodic, i.e., are sources of PEIN.

In addition to the classification of noise, other critical information of importance to a service provider is the length and the inter-arrival time (IAT) of the impulse noise. These and other characteristics of impulse noise are illustrated in FIG. 1. FIG. 1 is an example of the impulse noise bursts (clusters) detected from an impulse noise sensor (INS). More precisely in general, an INS detects severely degraded DMT symbols, the effect of impulse noise, so even though language often is expressed as detecting or measuring impulse noise, in practicality, most INM approaches actually monitor severely degraded DMT symbols. The IAT is the number of data symbols from the start of an impulse noise cluster to the start of the next impulse noise cluster. If one or more sync symbols occur between two clusters, they shall not be counted in the IAT. More specifically, in FIG. 1, impulse 102, 104, and 106 are part of a first impulse noise cluster (CL1); impulse 108 comprises a second impulse noise cluster (CL2). The number of symbols between the start of the first impulse in a noise cluster and the end of the last impulse in a noise cluster is the impulse noise cluster length (INCL) as illustrated for the first impulse noise cluster. The number of degraded symbols in a given impulse noise cluster defines INCD. The number of gaps in the impulse noise clusters defines INCG. A cluster, per the VDSL2 standard (ITU G.993.2 Amendment 2, February 2008) as well as other standards, is defined by the impulse noise monitoring cluster continuation (INMCC)

parameter. If two impulses are within INMCC they are considered part of the same cluster as indicated for impulses 102, 104, and 106. However, impulses 106 and 108 are separated by more than INMCC so they are not part of the same cluster.

Additionally according to the VDSL2 standard, the equivalent INP (INP_eq) should be calculated as a standard calculated value based on the INM_INPEQ_MODE parameter and can be dependent on the INMCC, INCL and/or INCD as given below. The VDSL2 standard specifies that the INMCC parameter can be provided as a central-office (CO) management information base (MIB) parameter and can have integer values from 0 and 64. Specifically, the equivalent INP is a quantity that can be used by the impulse noise protection system to better configure its impulse noise mitigation. For example, the equivalent INP could be the impulse noise cluster length so that a channel coding system such as a Reed-Solomon interleaving system can allocate enough redundant information to compensate for the impulse noise. The particulars of the desired equivalent INP can vary depending on the impulse noise protection scheme used. The standard defines a total measurement counter, INMAME, which is incremented whenever a data symbol is processed by the INS. In effect, the value of INMAME can be used to keep track of time. The standard also defines a histogram INMAINPEQ comprising histogram primitives $INMAINPEQ_{1-17}$ which are incremented based on the INP_eq. For example, $INMAINPEQ_i$ is incremented each time INP_eq=i, with the exception that $INMAINPEQ_{17}$ is incremented when INP_eq>16. Another histogram defined by the standard is INMAIAT comprising histogram primitives $INMAIAT_{0-7}$ which are incremented based on the IAT. It uses two parameters, the INM inter-arrival time offset (INMIATO), which can take on valid values of 3-511 and the INM inter-arrival time step (INMIATS) which can have valid values of 0-7. While the values of INMIATO and INMIATS have initial default values of 3 and 0, respectively, the standard does not describe any method for adjusting or optimizing these parameters.

FIG. 2 shows how the various $INMAIAT_i$ histogram primitives are incremented. Since, in the minimum case, IAT value can only be as small as 2, $INMAIAT_0$ range starts at 2. The range ends at INMIATO−1, making the range contain INMIATO−2 values. Histogram primitives $INMAIAT_{1-6}$ divide up the next six regions equally so that they all have $2^{INMIATS}$ values. Specifically, $INMAIAT_1$ is incremented whenever an IAT value falls between INMATO and $INMIATO+2^{INMIATS}-1$, $INMAIAT_2$ is incremented whenever an IAT value falls between $INMIATO+2^{INMIATS}$ and $INMIATO+2\times2^{INMIATS}-1$, $INMAIAT_3$ is incremented whenever an IAT value falls between $INMIATO+2\times2^{INMIATS}$ and $INMIATO+3\times2^{INMIATS}-1$, $INMAIAT_4$ is incremented whenever an IAT value falls between $INMIATO+3\times2^{INMIATS}$ and $INMIATO+4\times2^{INMIATS}-1$, $INMAIAT_5$ is incremented whenever an IAT value falls between $INMIATO+4\times2^{INMIATS}$ and $INMIATO+5\times2^{INMIATS}-1$, and finally $INMAIAT_6$ is incremented whenever an IAT value falls between $INMIATO+5\times 2^{INMIATS}$ and $INMIATO+6\times2^{INMIATS}-1$. The counter $INMAIAT_7$ is reserved to be incremented for any value of IAT greater still, that is, greater than $INMIATO+6\times2^{INMIATS}$.

In addition, the VDSL2 standard as well as others, such as the ADSL2+ standard are now requiring modems to have a built in capability of monitoring the impulse noise in the field. The standard dictates the method for deriving some standard INM parameters.

FIG. 3 shows a functional block diagram of an impulse noise monitor as prescribed by the standards. Impulse Noise Sensor 302 (INS) indicates whether a data symbol is severely degraded or not. The implementation details for this sensor are well known in the art. If a sync symbol occurs between two data symbols (severely degraded or not), INS 302 will disregard it.

Cluster indicator 306 indicates short groups of severely degraded data symbols as clusters. The cluster can contain a single severely degraded data symbol, a group of consecutive severely degraded data symbols, or several groups of one or more consecutive severely degraded data symbols with gaps between the groups. Cluster indicator 306 uses the following rule to identify the cluster. A gap is defined as a group of non-severely degraded data symbols in between two severely degraded data symbols. A cluster is defined as the largest group of consecutive data symbols, starting and ending with a severely degraded data symbols, containing severely degraded data symbols, separated by gaps smaller than or equal to INMCC as described above. As a consequence of the above definition of a cluster, each cluster starts with a severely degraded data symbol preceded by a gap larger than INMCC and ends with a severely degraded data symbol followed by a gap larger than INMCC, while gaps inside the cluster are all smaller than or equal to INMCC.

Eq INP generation block 308 is used to generate the "Equivalent INP" (i.e., the INP_eq described above) of the cluster as prescribed by the standard. It can use the INCL, INCD and INCG as calculated by cluster indicator 306. The generation is dependent on the mode selected by the parameter INM_INPEQ_MODE. If INM_INPEQ_MODE is zero then INP_eq is set to INCL, and INMCC is also set to zero irrespective of the CO MIB setting. If INM_INPEQ_MODE is one then INP_eq is also set to INCL with INMCC set to the CO MIB specified value. If INM_INPEQ_MODE is two then INP_eq is set to INCD with INMCC set to the CO MIB specified value. If INM_INPEQ_MODE is three then INP_eq is set using a set of equations related to interoperation with a Reed-Solomon coding as defined in the standard, specifically in Draft Amendment 2 to International Telecommunications Union (ITU-T), "Recommendation G.993.2, Very High Speed Digital Subscriber Line transceivers 2 (VDSL2)", Section 11.4.2.2, pp. 15-20, 2007, henceforth referred to as "Draft Amendment 2," which is hereby incorporated by reference. If INM_INPEQ_MODE is four, then INP_eq is essentially set to a vendor specified value.

In IAT generation block 310, the IAT is generated as the number of data symbols from the start of a cluster to the start of the next cluster. If sync symbols occur between two clusters, they shall not be counted in the IAT.

Block 312 generates anomalies for several ranges of IAT as described in FIG. 2 and appropriate INM counters 314 are incremented, specifically those that represent the IAT histogram. Furthermore, block 312 generates anomalies for several values of INP_eq as described above and appropriate INM counters 314 are incremented, specifically those that represent the INP_eq histogram. Finally, INM counters 314 further comprise the INMAME counter which is incremented for each data symbol encountered or processed by the INS.

What is currently lacking is a solution for processing the standard based INM parameters and primitives described above into information that is meaningful to the service provider, e.g., the length and the inter-arrival time of the impulse noise sources such as REIN. Such a method would be applicable to any modem running a standard compliant INM and would be of paramount importance. This shall aid to characterize the impulse noise occurring on the line so that the appropriate INP parameters could be chosen/tuned to ensure that physical layer CRC errors caused by the noise are corrected.

The INM procedure specifies the messaging protocol and the standard parameters which need to be calculated by the customer premises equipment (CPE). The CO acts as a master, and can set the parameters or read-out the calculated values using the INM facility command, which is a standard based mechanism to exchange INM commands between the CO and CPE and can set the values for INMIATO, INMIATS, INMCC and INM_INPEQ_MODE. The CPE is expected to use the set configuration by the CO and calculate all the parameters using a typical block diagram as shown in FIG. 3.

The previous solutions do not address the classification of the type of impulse noise occurring in the field and identify multiple REIN sources in xDSL INM. Moreover, no solution that we know of leverages the INM parameters and histogram primitives in the standards to ensure that the modems work satisfactorily against a wide array of impulses in the field. There are variations towards the impulse noise predictions which are captured below.

Bailey, et al, in U.S. Pat. No. 7,274,746 proposes an impulse noise mitigation based on the prediction of an impulse noise to carry out its mitigation. Schmidt, et al., in U.S. Pat. No. 7,263,174 proposes impulse noise mitigation based on a system to sum the number of counts to produce a rate for noise impulse. Both these approaches provide means to predict the performance of the line, but are not sufficient to tune the INP parameters.

Kerpez, et al, in U.S. Pat. No. 7,106,833 proposes yet another approach which provides a means to measure impulse noise by long-term (an hour or more) monitoring of raw bit errors, to enable identification of the impulse noise. However, there is no impulse noise classification involved and mere monitoring of impulse noise in long-term is not enough. Typically, not enough information is gathered to protect modems quickly against a wide array of impulse noises in the field.

Betts, et al, in U.S. Pat. No. 7,031,381, provides a method to reduce the number of bit errors that occur as a result of periodic transients in DSL data transmission by suspending or reducing data transmission during the occurrence of a subsequent transient. In this case, there is no mention of the INP tuning involved.

Khadavi, et al, in U.S. Pat. No. 7,027,405, proposes another approach based on the impulse noise counts in order to qualify the local loop for a particular DSL technology. Bremer, et al., in U.S. Pat. No. 6,885,730, proposes a method to count the occurrences per minute of impulse noise for testing the subscriber loop conditions. Again both these approaches fail to classify the type of impulse noise encountered.

There are numerous applications of time analysis used to detect and estimate signals in the signal processing context. For example, Chen, et al, in U.S. S.I.R. H001726 and Varshney et al ("Radar Signal Detection and Estimation Using Time-frequency Distributions," Syracuse University, NY, October 1995) both use applications of time analysis in the field of radar. Liu, et al, ("Fundamental Frequency Estimation Based on the Joint Time-Frequency Analysis of Harmonic Spectral Structure," IEEE Transactions of Speech and Audio processing, Vol. 9, No. 6, September 2001) use applications of time analysis in the field of speech. Papandreou, et al. ("Detection and Estimation of Generalized Chirps Using Time-frequency Representations," Signals, Systems and Computers, 1994 Conference Record of the Twenty-Eighth Asilomar Conference, Volume 1, Issue, 31 Oct.-2 Nov. 1994 Page(s):50-54 vol. 1) use applications of time analysis on non-stationary signals such as chirp signals.

Finally, in a prior patent application U.S. application Ser. No. 12/098,696 entitled "Systems and Methods for Monitoring Impulse Noise" filed on Apr. 7, 2008 which is incorporated by reference herewith, a dual-speed detection and estimation approach to monitor impulse noise conditions on the line which adopts post processing based on non-standard histogram primitives is proposed.

Accordingly, various needs exist in the industry to address the aforementioned deficiencies and inadequacies.

SUMMARY OF INVENTION

A system and method for impulse noise characterization comprises three basic components, an impulse length analysis engine, an IAT analysis engine and a combiner. The impulse length analysis engine and the IAT analysis engine both receive standard defined histograms based on information gathered from an impulse noise sensor. Based on these histograms, the impulse length analysis engine can detect periodic impulse noise sources of various impulse lengths. Furthermore, the impulse length analysis engine can determine the number of periodic impulse noise sources present. Additionally, by compensating for overlapping impulse sources, the impulse length analysis engine can estimate the frequency of each periodic impulse noise source. Other aspects of the impulse length analysis engine include an ability to detect false alarms from the INS and even trigger a re-tuning if the false alarms appear pervasive.

The IAT analysis engine can determine optimal values for standards defined parameters INMIATO and INMIATS based on seeking the maximum capture zone and minimizing the resolution in the INMAIAT histogram. Once optimal values are determined, the IAT analysis engine can determine the maximum frequency of the periodic impulse noise sources present and determine the presence of multiple impulse noise sources.

The combiner can combine the findings of the impulse length analysis engine and the IAT analysis engine. The combiner utilizes results from multiple observation windows and can determine the presence of long period REIN, long period PEIN sources as well as SHINE. In addition, the combiner can refine the determination of multiple impulse noise sources. Furthermore, the combiner can also refine the determination of the maximum frequency of the impulse noise sources present.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 14 illustrates the performance of an exemplary impulse length analysis engine in estimating impulse length using the standard INM histogram INMAINPEQ;

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 4:
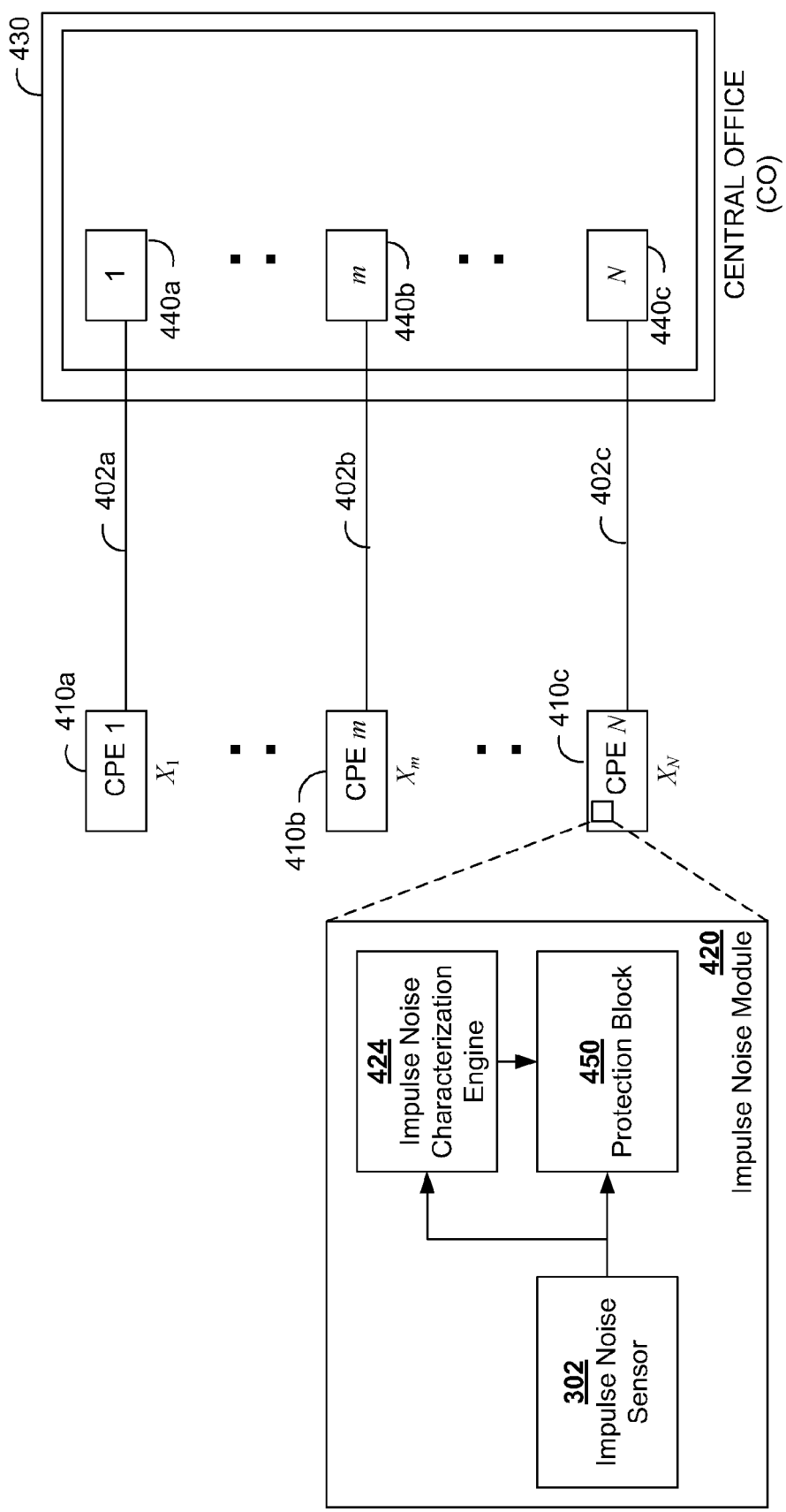
FIG. 4 illustrates an xDSL system in which embodiments for monitoring impulse noise are applied.

Reference is now made to FIG. 4, which illustrates an xDSL system in which embodiments for monitoring impulse noise are applied. In the non-limiting example shown in FIG. 4, N end users (or N sets of CPE 410a, 410b, 410c) are depicted where each user 410a, 410b, 410c is referenced using an index m. The end users 410a, 410b, 410c are connected via a loop 402a, 402b, 402c to a CO 430. The CO 430 may include an xDSL access multiplexer (DSLAM), xDSL line cards 440a, 440b, 440c, and other equipment for interfacing with end users 410a, 410b, 410c.

In accordance with some embodiments, impulse noise module 420 for monitoring and characterizing impulse noise may be incorporated into end users/CPE 410a, 410b, 410c. While embodiments for impulse noise monitoring are described here in the context of CPE 410a, 410b, 410c, the principles discussed herein may also be incorporated into CO 430.

Figure 3:
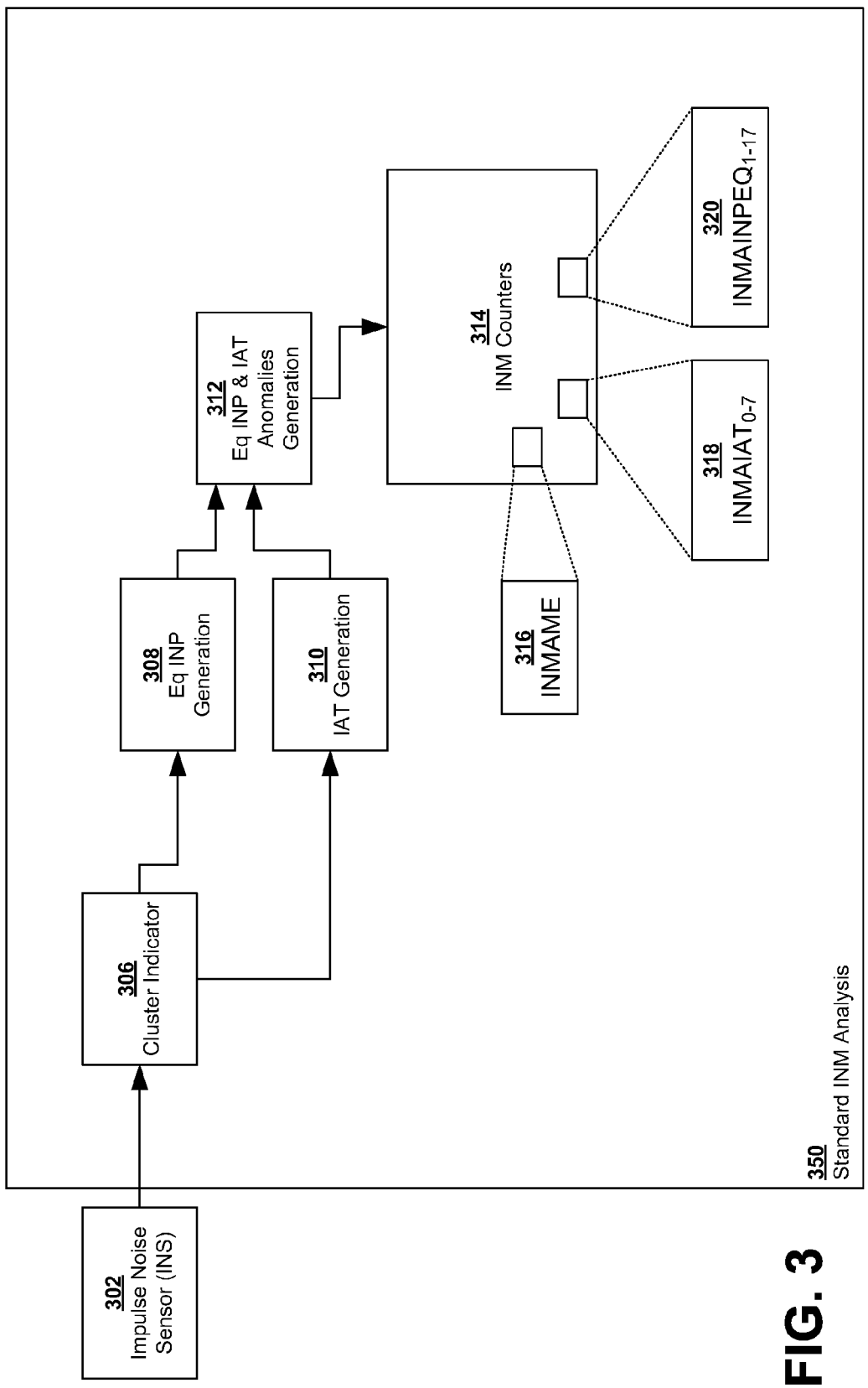
FIG. 3 shows a functional block diagram of an impulse noise monitor as prescribed by the standards.
Figure 5:
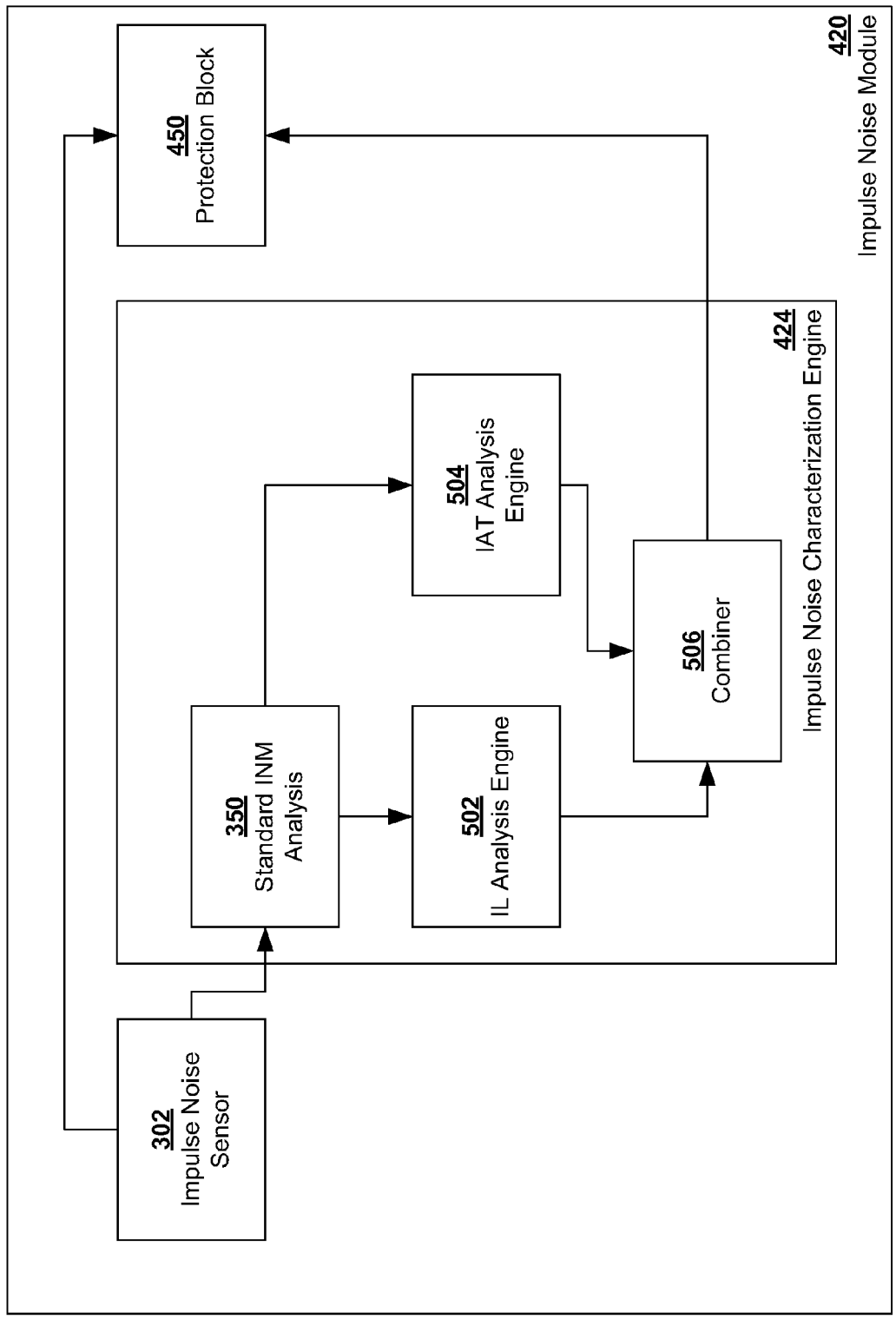
FIG. 5 depicts various components for the impulse noise module.

As depicted in FIG. 4, impulse noise module 420 may comprise impulse noise sensor 422 like impulse noise sensor 302 in FIG. 3, impulse noise characterization engine 424, and protection block 450. Impulse noise sensor 422 detects the presence of impulse noise, and impulse noise characterization engine 424 monitors and characterizes any detected impulse noise on lines 402a, 402b, 402c. Protection block 450 provides a mechanism for avoiding bit errors during the occurrence of impulse noise. FIG. 5 depicts various components for the impulse noise module depicted in FIG. 4. In accordance with exemplary embodiments, impulse noise characterization engine 424 of impulse noise module 420 may further comprise standard INM analysis 350 as described above in FIG. 3, impulse length analysis engine 502, IAT analysis engine 504, and combiner 506.

As mentioned above, impulse noise characterization engine 424 comprises impulse length analysis engine 502, IAT analysis engine 504, and combiner 506. Impulse length analysis engine 502 uses the standard INM histogram INMAINPEQ and the counter INMAME described above to classify the impulse noise sources into one or more of the following three categories, periodic source, long-impulse length source, and anomaly due to a false alarm at the output of the impulse noise sensor. Specifically, a periodic source is either a REIN or PEIN source having an impulse length less than or equal to sixteen DMT symbols. A long impulse length source could be periodic such as a REIN or PEIN source having an impulse length greater than sixteen DMT symbols or a non-periodic (SHINE source).

Impulse length analysis engine 502 can further classify periodic sources by estimating the number of REIN or PEIN sources occurring on the line, estimating the impulse length of each periodic impulse noise source, detecting a false alarm at the output of the impulse noise sensor, estimating the IAT or frequency of each impulse noise source, determining the existence of multiple impulse noise sources on the line, and providing an indication of the presence of a non-classifiable source.

IAT analysis engine 504 processes the standard INM histogram primitives $INMAIAT_{0-7}$ based on the parameters INMIATO and INMIATS as described above. Since INMIATO and INMIATS are adjustable parameters, IAT analysis engine 504 first determines the optimal values for the parameters INMIATO and INMIATS, with the optimality criteria being the prevention of overflow while maintaining maximum resolution. This is described in greater detail below. Once the optimal values of the parameters INMIATO and INMIATS are determined, IAT analysis engine uses the INM histogram primitives $INMAIAT_{0-7}$ resulting from these optimal parameters to estimate the maximum frequency of a periodic source occurring on the line and determine the existence of multiple impulse noise sources on the line.

Combiner 506 combines the various features extracted from the impulse length analysis engine and the IAT analysis engine to classify the long-IL sources into one or more of the following sources, long-IL periodic REIN or long-IL periodic PEIN, long-IL non-periodic SHINE, to provide a refined estimate of the maximum frequency (or minimum IAT) occurring on the line and a multi-source flag.

By providing all the above measures quickly, any dynamic changes in the impulse noise environment can be better tracked. The INM information is expected to be used in real time to tune the INP features embedded in the DSL platforms, towards appropriate protection.

Embodiments of the protection block 450 are known to those of ordinary skill in the art. A specific example can be found in co-pending U.S. patent application Ser. No. 12/098, 696 as cited above.

Figure 6:
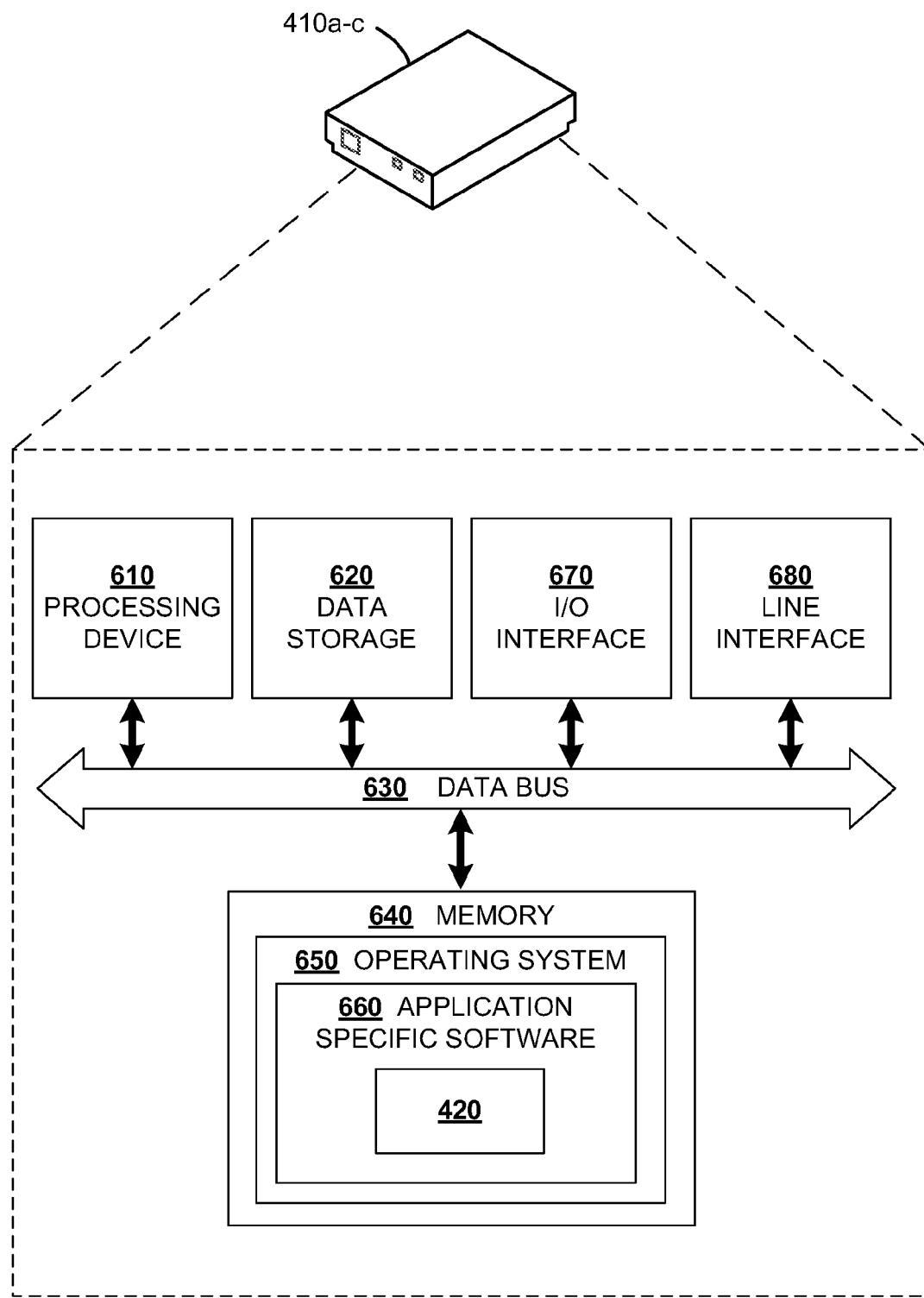
FIG. 6 is a block diagram of an embodiment of one of the end users.

Reference is now made to FIG. 6, which is a block diagram of an embodiment of one of the end users depicted in FIG. 4. In accordance with certain embodiments, the steps for performing detection and monitoring of impulse noise sources described in this disclosure may be incorporated in software within an end user such as a DSL modem. One of ordinary skill in the art will appreciate that DSL modems comprise other components, which have been omitted for purposes of brevity. Generally, DSL modem 410*a-c* may include processor 610, memory component 640 (which may include volatile and/or nonvolatile memory components), and data storage component 620 that are communicatively coupled via local interface 630, such as a data bus. In addition, the DSL modem 410*a-c* comprises input/output interface 670 which can be coupled to an end user device such as a PC, router, wireless access point, etc. and can be an Ethernet interface. DSL modem 410*a-c* further comprises line interface 680 which can be coupled to the DSL loop to communicate with a CO. Line interface 680 can comprise elements such as a line driver, analog front end and DSL transceiver.

Local interface 630 may have additional elements, which are omitted for simplicity, such as controllers, buffers (caches), drivers, repeaters, and receivers to enable communications. Further, the local interface may include address, control, and/or data connections to enable appropriate communications among the aforementioned components. Processor 610 may be a device for executing software, particularly software stored in memory component 640. Processor 610 can be any custom made or commercially available processor, a central processing unit (CPU), an auxiliary processor among several processors associated with DSL modem 410*a-c*, a semiconductor based microprocessor (in the form of a microchip or chip set), a macroprocessor, or generally any device for executing software instructions.

Memory component 640 can include any one or a combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, memory component 640 may incorporate electronic, magnetic, optical, and/or other types of storage media. One should note that some embodiments of memory component 640 can have a distributed architecture (where various components are situated remotely from one another), but can be accessed by processor 610.

The software in memory component 640 may include one or more separate programs, each of which includes an ordered listing of executable instructions for implementing logical functions. In the example shown in FIG. 6, the software in memory component 640 may include operating system 650. Furthermore, the software residing in memory component 640 may include application specific software 660, which may further comprise impulse noise module 420 as depicted in FIGS. 4 and 5. It should be noted, however, that these modules can be implemented in software, hardware or a combination of software and hardware. Operating system 650 may be configured to control the execution of other computer programs and provides scheduling, input-output control, file and data management, memory management, and communication control and related services.

A system component and/or module embodied as software may also be constructed as a source program, executable program (object code), or script, comprising a set of instructions to be performed. When constructed as a source program, the program is translated via a compiler, assembler, interpreter, or the like, which may or may not be included within memory component 640, so as to operate properly in connection with operating system 650. When DSL modem 410*a-c* is in operation, processor 610 may be configured to execute software stored within memory component 640, communicate data to and from memory component 640, and generally control operations of DSL modem 110*a-c* pursuant to the software. Software in memory may be read by processor 610, buffered within processor 610, and then executed.

Impulse noise characterization engine 424 uses standard based INM histogram primitives and parameters (e.g., INCL, INCD, INCG, INP_eq, etc.). Using the standard histogram primitives, impulse noise characterization engine 424 can estimate the IL and the IAT of each periodic impulse noise source on the line. This information could potentially be used to refine the calculations of INP parameters (number of redundancy bytes R, interleaver depth D, etc and hence the MIB parameters INP_min and maximum delay delay_max), Virtual noise specifications (Virtual noise PSD calculation), etc., which are required for robust operation of xDSL systems in the presence of impulse noise.

In the simplest case, the maximum IL estimated by impulse noise characterization engine 424 can be used to determine the INP parameter INP_min used by protection block 450. A more advanced scheme can use the REIN source frequency with occurrence time stamps to optimize the tracking of various signal processing blocks like frequency domain equalizer (FEQ) and timing recovery within protection block 450.

Figure 1:
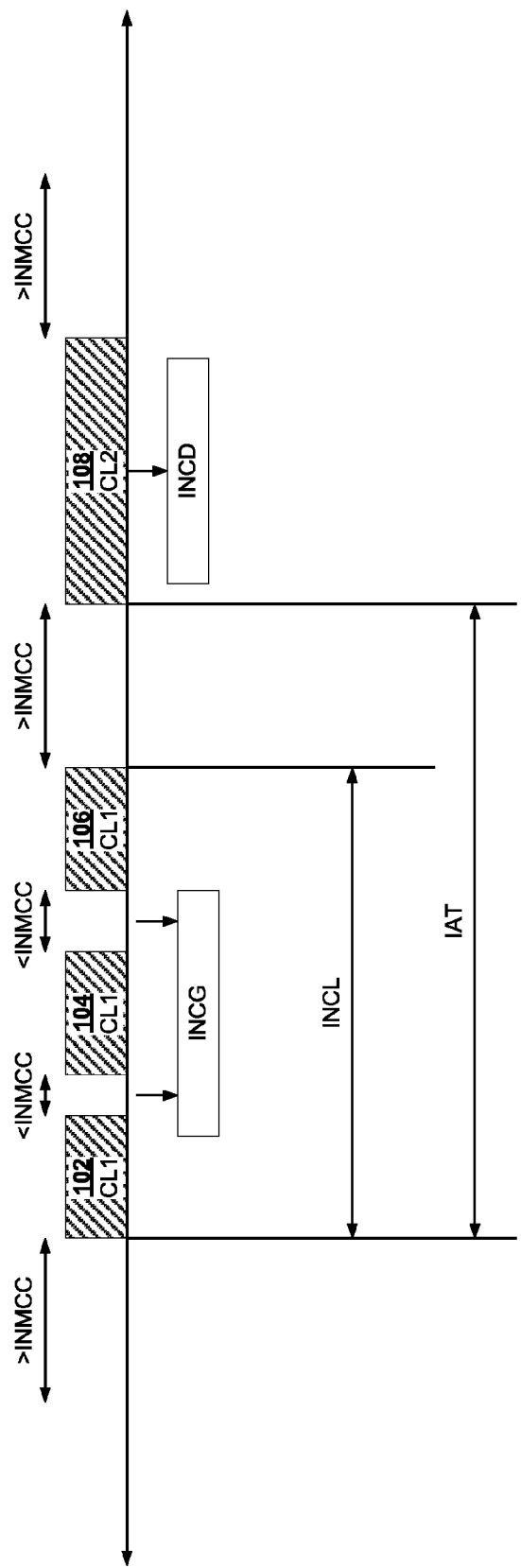
FIG. 1 is an example of the impulse noise bursts (clusters) detected from an INS.
Figure 2:
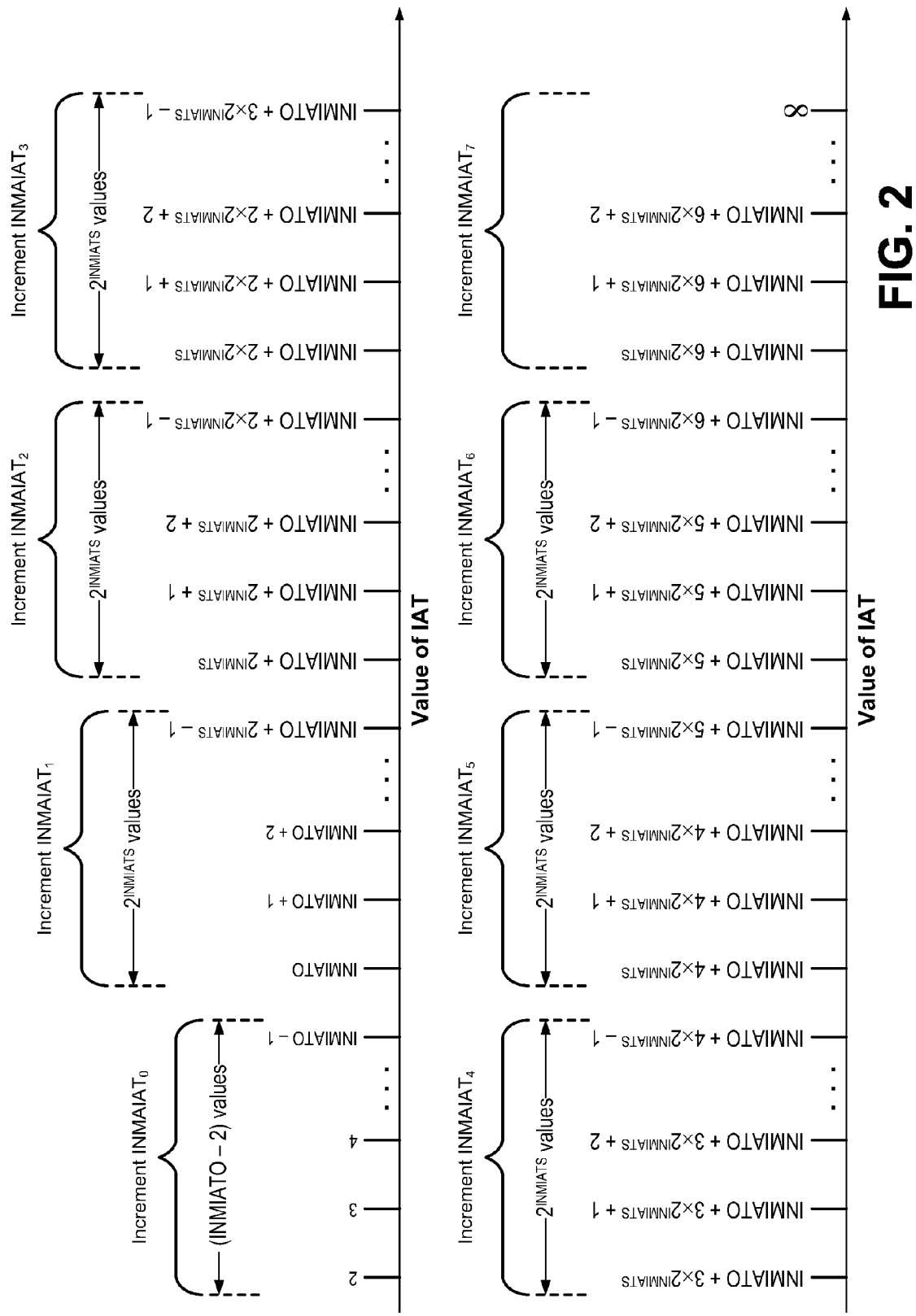
FIG. 2 shows how the various INMAIAT$_i$ histogram primitives are incremented.

The impulse noise characterization engine 424 also uses the standard recommended parameters and primitives which are computed by standard INM procedures 350 using the output of the INS. The INS provides a flag indicating whether a DMT symbol is degraded by impulse noise or not. The standard histogram primitives and parameters are computed based on the ITU-T Recommendation G.993.2 as illustrated above in FIGS. 1-3. Configurable parameters INMCC, INMIATO, INMIATS and INM_INPEQ_MODE can be changed dynamically by the CO in showtime. It should be noted that for the sake of example, impulse noise characterization engine 424 uses the default value if INM_INPEQ_MODE of 0 meaning that the INP_eq is equal to the cluster length and uses the default value of INMCC of zero meaning that each cluster comprises one impulse. Therefore, the equivalent INP in this scenario is equal to the impulse length. One of ordinary skill can easily recognize that the techniques used here can apply to any form of equivalent INP based on the impulse noise protection system used. In the context of the remainder of this disclosure, a broader meaning of the term impulse length should be taken, that is, unless otherwise specified, impulse length should be taken to mean equivalent INP.

Figure 7:
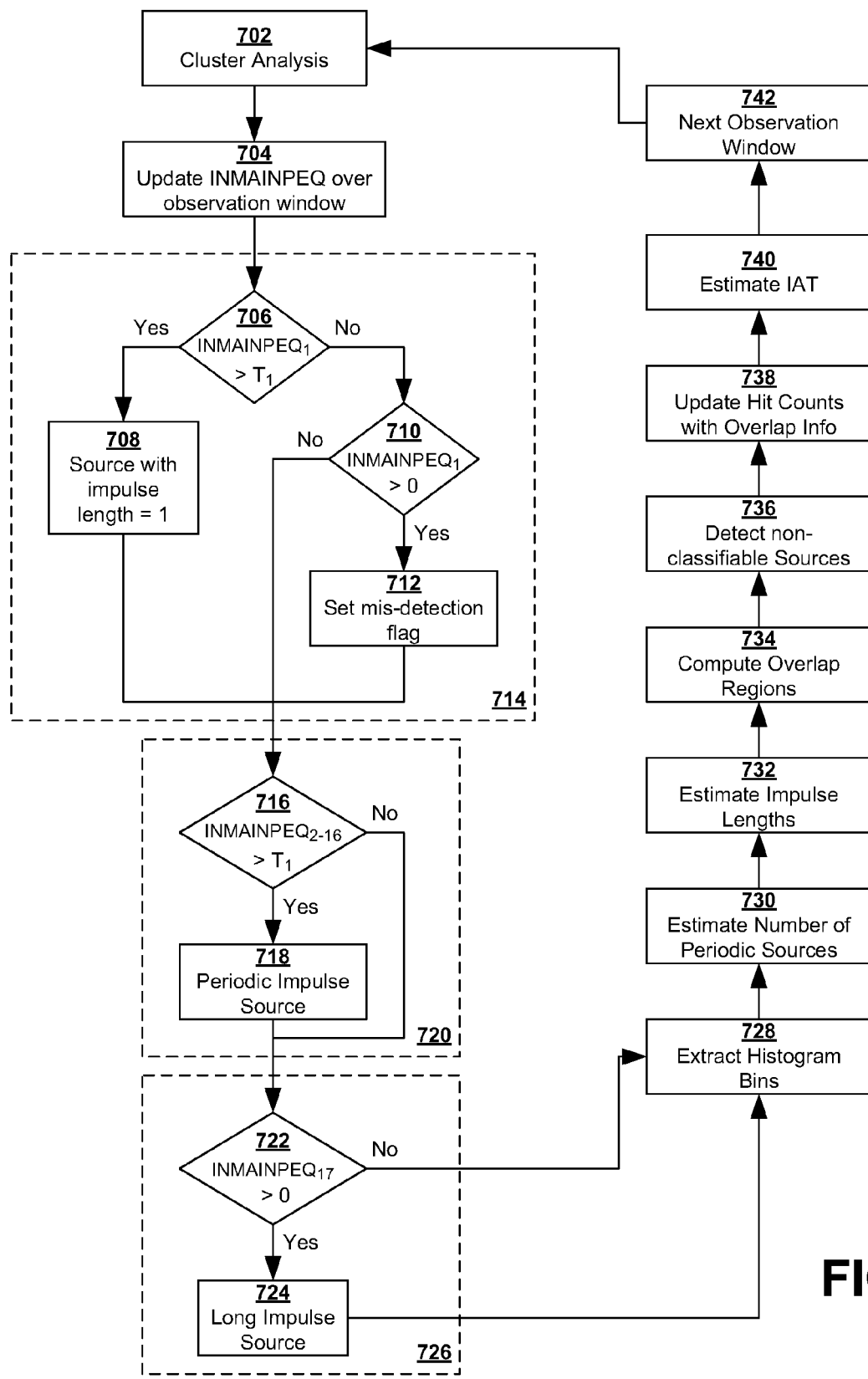
FIG. 7 is a flow chart illustrating the operation of the impulse length analysis engine.
Figure 8:
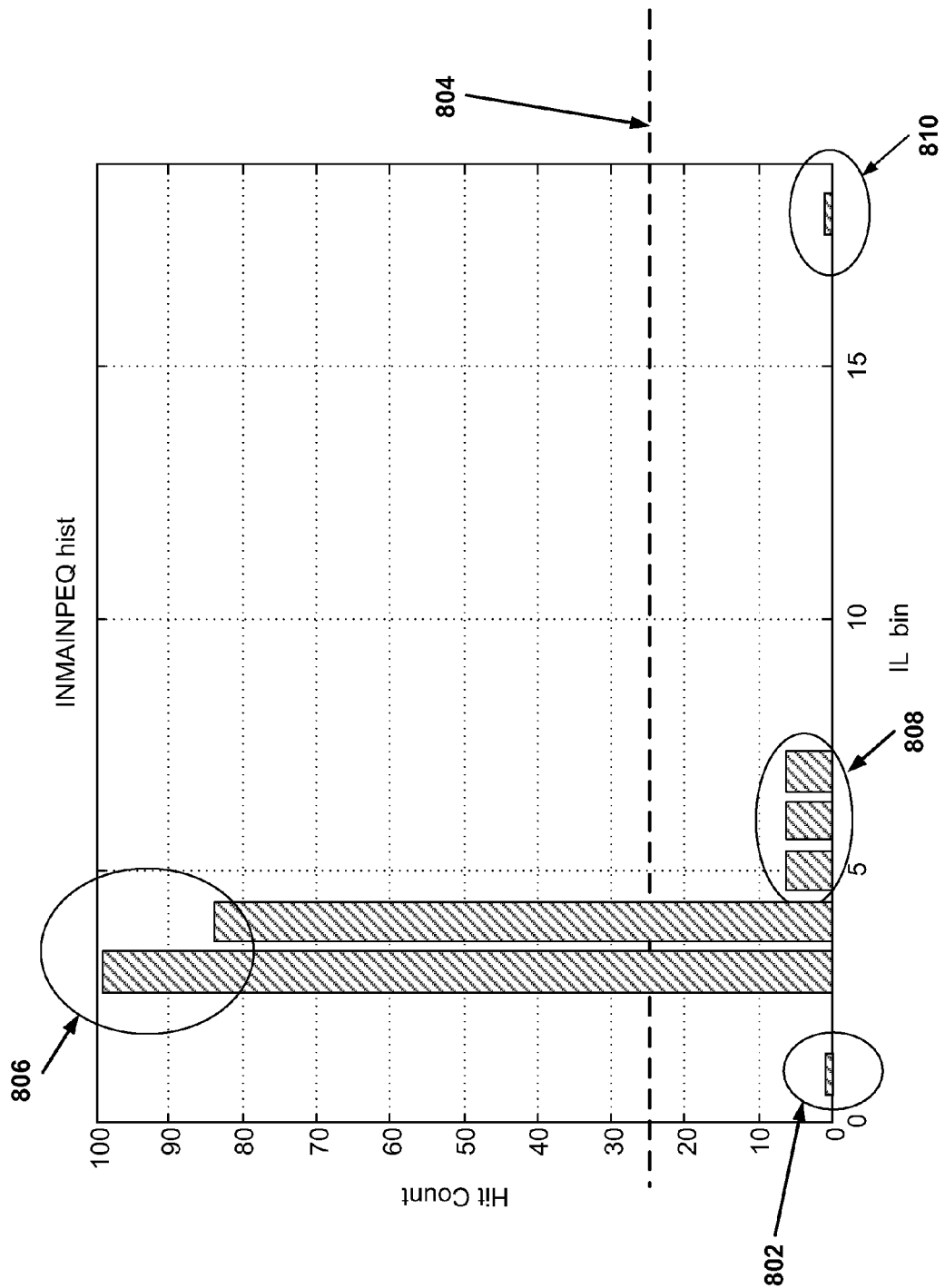
FIG. 8 illustrates an exemplary INMAINPEQ histogram for a specific impulse noise scenario.

Specifically, FIG. 7 is a flow chart illustrating the operation of impulse length analysis engine 502. Furthermore, FIG. 8 illustrates an exemplary INMAINPEQ histogram for a specific impulse noise scenario. With regard to FIG. 8, the exemplary impulse noise scenario illustrates 2 REIN sources and 1 SHINE source. The REIN sources have impulse length of 3 and 4 DMT symbols and frequency of 120 Hz and 100 Hz, respectively. The SHINE source has an impulse length of 30

DMT symbols. In this example, the range of frequencies monitored is between 30 Hz to 200 Hz with an observation window of 4096 DMT symbols corresponding to duration of about 1 sec.

In summary, the operation of the impulse length analysis engine operates on the net change in the INMAINPEQ histogram during an observation window, by first performing cluster analysis and comparing the difference between the INMAINPEQ histogram at the beginning and at the end of the observation window, as calculated by standards based cluster analysis. After the net change is obtained, source classification is performed and finally the important data relating to impulse noise is extracted. The observation window is then shifted by a fixed time interval and the process can repeat. It may be desirable for consecutive or even multiple observation windows to overlap. For example, the observation window may be 4096 DMT symbols, but the predefined distance between the start of two consecutive observation windows may be 512 DMT symbols.

At step 702 cluster analysis is performed based on predetermined parameters such as INCL, INCD, INCG, INM_INPEQ_MODE, INMCC and INMAME. The performance of step 702 can be in accordance with the methods described in the standards (see Draft Amendment 2). The result of this step is the generation of the histograms primitives $INMAINPEQ_{1-17}$. It should be noted that unless the INM parameters are reset, the histogram is not allowed to be reset in accordance with the standard.

Because of their non-resetable nature, all INMAINPEQ primitives' values are read out from the cluster analysis and stored. At step 704, the difference between the INMAINPEQ primitives' values at the end of the observation window and at the beginning of the observation which was previously stored is calculated and stored for use by impulse length analysis engine 502. This yields the number of hits in any INMAINPEQ histogram primitive over the observation window.

With regard to the sub-procedure 714, impulse length analysis engine 502 detects whether there is an anomaly due to a "false alarm" at the output of the impulse noise sensor. If there is an anomaly due to a false alarm, it is recorded as a hit in $INMAINPEQ_1$. If the number of hits in $INMAINPEQ_1$ is non-zero over the observation window, either there is a periodic impulse noise source of impulse length 1 or there is an anomaly due to a false alarm at the output of the impulse noise sensor. The mis-detections, i.e., "false alarm" and "miss" events, at the output of the impulse noise sensor have a significantly small probability of occurrence provided that the design parameters of the impulse noise sensor are chosen appropriately as is known by those of skill in the art, see Amitkumar Mahadevan, Julien Pons, and Patrick Duvaut, "Performance and Design of an Impulse Noise Detector for OFDM Systems with Reed-Solomon Erasure-Decoding," *Global Telecommunications Conference,* 2008, IEEE, Nov. 30, 2008-Dec. 4, 2008, pp. 1-6, which is incorporated by reference. As a result a large number of hits in $INMAINPEQ_1$ would be indicative of a periodic impulse noise source. In FIG. 8, the histogram at 802 shows a single hit at $INMAINPEQ_1$ which impulse length analysis engine 502 would attribute to a mis-detection of the INS. Had the number of hits exceeded predetermined threshold ($T_1$) 804, impulse length analysis engine 502 would attribute the hits to a periodic impulse noise source. In the event a large number of false alarms are encountered impulse length analysis engine 502 can trigger the INS to re-tune. The triggering can be in the form of a message recommending specific new threshold values, a message indicating that new threshold values that need to be found leaving the adjustment up to the INS, or a command forcing the INS to be re-tuned. The specifics can vary depending on the implementation of the INS.

Specifically, at step 706, impulse length analysis engine 502 determines whether the number of hits in $INMAINPEQ_1$ exceeds predetermined threshold $T_1$. If so at step 708, a periodic impulse source having impulse length of 1 is indicated. If not at step 710, impulse length analysis engine 502 determines whether there are any hits in $INMAINPEQ_1$. If so, an impulse noise sensor misdetection flag is set at step 712. In the event of a high rate of misdetection by the INS, the INS might need to be re-tuned.

Sub-procedure 720 determines the presence of periodic impulse sources having impulse length less than 17. The impulse noise source is classified as a periodic source if the difference of hits over the observation window of the histogram primitive $INMAINPEQ_{2-16}$ exceeds predetermined threshold $T_1$. Predetermined threshold $T_1$ used by impulse length analysis engine 502 can be monitored and tuned accordingly for different noise conditions on the line. Typically, predetermined threshold $T_1$ can be selected to be the product of the expected minimum frequency of the impulse noise, the observation window duration (in seconds), and an overlap correction factor. The overlap correction factor is selected between zero and one, 0.8 for example, and is selected to compensate for the potential for overlapping noise sources as described below. It should be noted that case of impulse noise with a length of one DMT symbol is dealt with in step 714.

In the example of FIG. 8, predetermined threshold 804 is set to 25. As can be seen, hits are seen as indicated at 806 where both exceed predetermined threshold 804 which indicates the presence of two periodic impulse sources of impulse length 3 and 4 as would be expected with two REIN sources of impulse length 3 and 4. At 808, some overlap hits are seen.

Figure 9A:
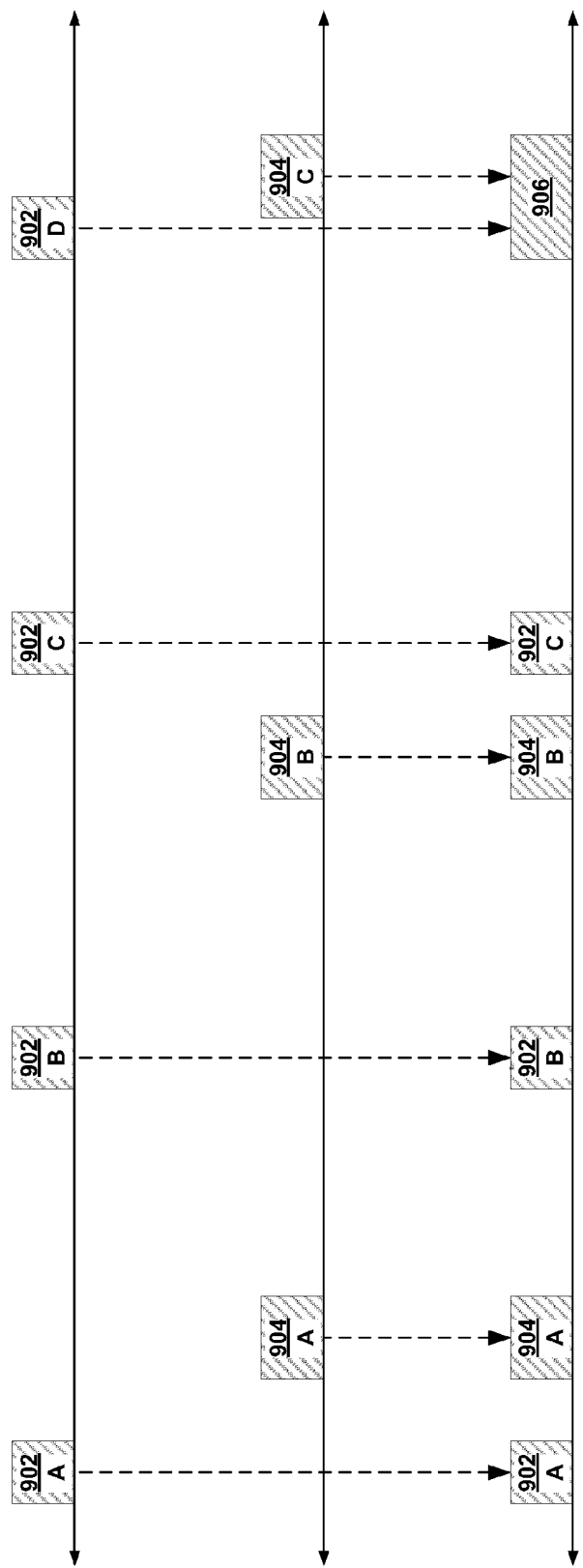
FIG. 9A illustrates the origin of overlap hits.

FIG. 9A illustrates the origin of overlap hits. The top timeline shows a periodic impulse noise source of impulse length 3. This comprises a sequence of impulses, 902A, 902B, 902C, 902D, etc. The second timeline shows another impulse noise source of impulse length 4. This comprises a sequence of impulses 904A, 904B, 904C, etc. It should be noted that in this example there is a difference in periodicity of the two periodic noise sources. The third timeline illustrates the composite impulse noise from both sources. Most of the time the impulses don't overlap, but on occasion the impulses do overlap forming what appears to be an impulse with a longer impulse length as shown in this example as impulse 906 with length 6. So referring back to FIG. 8, overlapping impulses can register as hits in $INMAINPEQ_5$, $INMAINPEQ_6$, and $INMAINPEQ_7$. The set of histogram primitives which can be produced by overlapping impulses are known as the overlap region. For example, if there are two periodic impulse noise sources of impulse length $l_1$ and $l_2$, the overlap region comprises the values from max $(l_1, l_2)+1$ to $l_1+l_2$.

Sub-procedure 720 specifically comprises steps 716 and 718. At step 716, impulse length analysis engine 502 determines whether the number of hits in the histogram INMAINPEQ for impulse lengths 2 to 16 exceed predetermined threshold $T_1$. If so at step 718, a periodic impulse source having the identified impulse length is indicated. For example, if $INMAINPEQ_5$ has hits exceeding predetermined threshold $T_1$, a periodic impulse source having impulse length 5 is indicated.

Sub-procedure 726 determines the presence of long impulse length sources, either periodic or non-periodic. If hit counts are observed in the histogram primitive $INMAINPEQ_{17}$, the presence of a long impulse length periodic (REIN or PEIN) and/or a long impulse length non-periodic impulse noise source (such as SHINE) is determined whose impulse length is more than 16 DMT symbols. Combiner 506 can be used to distinguish between the different types of long impulse length sources. Furthermore, the distinction may also need multiple observation windows. In the example of FIG. 8 the SHINE source with impulse length 30 is mapped to the histogram primitive INMAINPEQ$_{17}$, which is recognized by impulse length analysis engine 502 as a hit.

The specific nature of this hit can be distinguished by combiner 506 as described below. For example, the classification of the impulse noise sources can be carried out over an observation window that spans the time-interval between two consecutive readings of the INMAINPEQ and INMAME primitives.

Specifically, at step 722, impulse length analysis engine 502 determines whether there are hits in the histogram primitive INMAINPEQ$_{17}$ over the observation window. If so a long impulse length source is indicated at step 724.

At step 728, impulse length analysis engine 502 extracts those histogram bins which exhibit hits over the observation windows in the INMAINPEQ$_{1-16}$ histogram primitives, which exceeds predetermined threshold T$_1$. It should be noted that histogram bins refer to the statistical meaning of bins and should not be confused with the term bins used in context of DMT tones. To avoid confusion, the terms histogram bins and DMT bins are used where appropriate in place of simply "bins." In the example of FIG. 8, histogram bins 3 and 4 are extracted.

At step 730, impulse length analysis engine 502 estimates the number of periodic sources present. The number of bins extracted in step 728 gives the number of periodic sources occurring on a line. If the number of sources is greater than one, then a multi-source flag is set. In the example of FIG. 8, impulse length analysis engine 502 would estimate 2 periodic sources and would set the multi-source flag.

At step 732, impulse length analysis engine 502 estimates the impulse lengths of the sources. The histogram bin for which the number of hits exceeds predetermined threshold T$_1$ as determined in step 728 provides the estimate of the impulse length (in DMT symbols) for each periodic source. Continuing with the example in FIG. 8, maximum hits occur in histogram bins 3 and 4 which correspond to the INM histogram primitives INMAINPEQ$_3$ and INMAINPEQ$_4$, hence confirming that the 2 periodic sources have an impulse length of 3 and 4 DMT symbols respectively.

At step 734, impulse length analysis engine 502 computes the overlap region. As described in FIG. 9A, impulse clusters with longer impulse lengths can occur when two or more impulse clusters overlap. The overlap region spans those histogram bins beginning with the histogram bin following the largest of the histogram bins representing identified periodic sources which correspond to substantial overlap between impulse clusters and range to the sum of all the histogram bins corresponding to the worst case of overlap. Specifically, with respect to FIG. 8, the overlap region begins with histogram bin 5, which is one greater than histogram bin 4, the larger impulse length of the two periodic sources, and ends with histogram bin 7, which is the sum of 3 and 4 of the histogram bins corresponding to the two sources.

The circumstances are more complicated with three or more sources, as a series of simultaneous equations must be solved as overlapped impulses cannot be assumed to belong to all impulse noise sources. There are several definitions of overlap region in the case of more than two sources that can be used. The overlap region can be taken as one greater than the maximum impulse length of all sources to the sum of all lengths of all sources. For example if impulse noise sources of impulse length 2, 4 and 5 are present, the overlap region can range from 6 to 11. However, if impulse noise sources of impulse length 2, 4 and 7, this definition would make the overlap region range from 8 to 13 even though overlap of the impulse noise sources of length 2 and the impulse noise source of length 4 could produce overlap impulses of length 5 and 6. Another definition of overlap region can be to take as the overlap region the range from one greater than the second shortest impulse length of all sources to the sum of all lengths of all sources, but excluding all histogram bins corresponding to impulse noise sources. Taking the last example, the overlap region would range from 5 (one greater than the second shortest impulse length of 4) to 13 but excluding 7 (which corresponds to an impulse noise source), that is, a region comprising the histogram bins 5, 6, 8, 9, 10, 11, 12, and 13. It may be even desirable to define multiple overlap regions. Again, taking the last example, hits that fall in the region beginning with histogram bin 5 and ending with histogram bin 6 cannot be attributed to the impulse noise source of length 7. However, hits that fall in the region beginning with histogram bin 8 and ending with histogram bin 11 can be attributed to any combination of the three impulse noise sources. Finally, hits that fall in the region beginning with histogram bin 12 and ending with histogram bin 13 can only be attributed to an overlap of all three impulse noise sources.

At step 736, impulse length analysis engine 502 determines the presence of a non-classifiable source. Any hits corresponding to histogram bins other than those histogram bins determined in step 728 and those histogram bins comprising the overlap region determined in step 734. These sources are considered non-classifiable because they do not correspond to histogram primitives of higher number than predetermined threshold T$_1$ or cannot be accounted for by the periodic sources, i.e., those that reside in the overlap region.

At step 738, impulse length analysis engine 502 refines the estimate of the hit counts using the overlap information. In the case of two periodic sources, the hits in the overlap region can simply be added to the hits determined in step 728. For example, in FIG. 8, there are 5 hits in each histogram bin comprising the overlap region, which total 15 hits which can be added to the hit count of histogram bins 3 and 4.

At step 740, impulse length analysis engine 502 estimates the inter-arrival time for each periodic source. Since the number of hits per source is known and size of the observation window is known, the frequency of each periodic source can be calculated, which in turn yields the period (or inter-arrival time) of each periodic source. In the manner described above, impulse length analysis engine 502 can supply estimates in the number of REIN sources occurring on the line, as well as an estimate of the impulse length, inter-arrival time of each REIN source and additionally provide a multi-source flag.

Finally at step 742, impulse length analysis engine 502 the observation window is advanced a predetermined time period and the process can be repeated and the impulse noise data refined at step 702. In many of the examples given, the predetermined time period is 512 DMT symbols in length, which corresponds to approx 125 ms.

IAT analysis engine 504 can be used to estimate the maximum frequency and determine if there are multiple impulse noise sources present. It uses the standard INM histogram INMAIAT which is determined by the parameters INMIATO and INMIATS. The default settings for the INMIATO and INMIATS parameters are 3 and 0, respectively, as described in the background section.

Figure 9B:
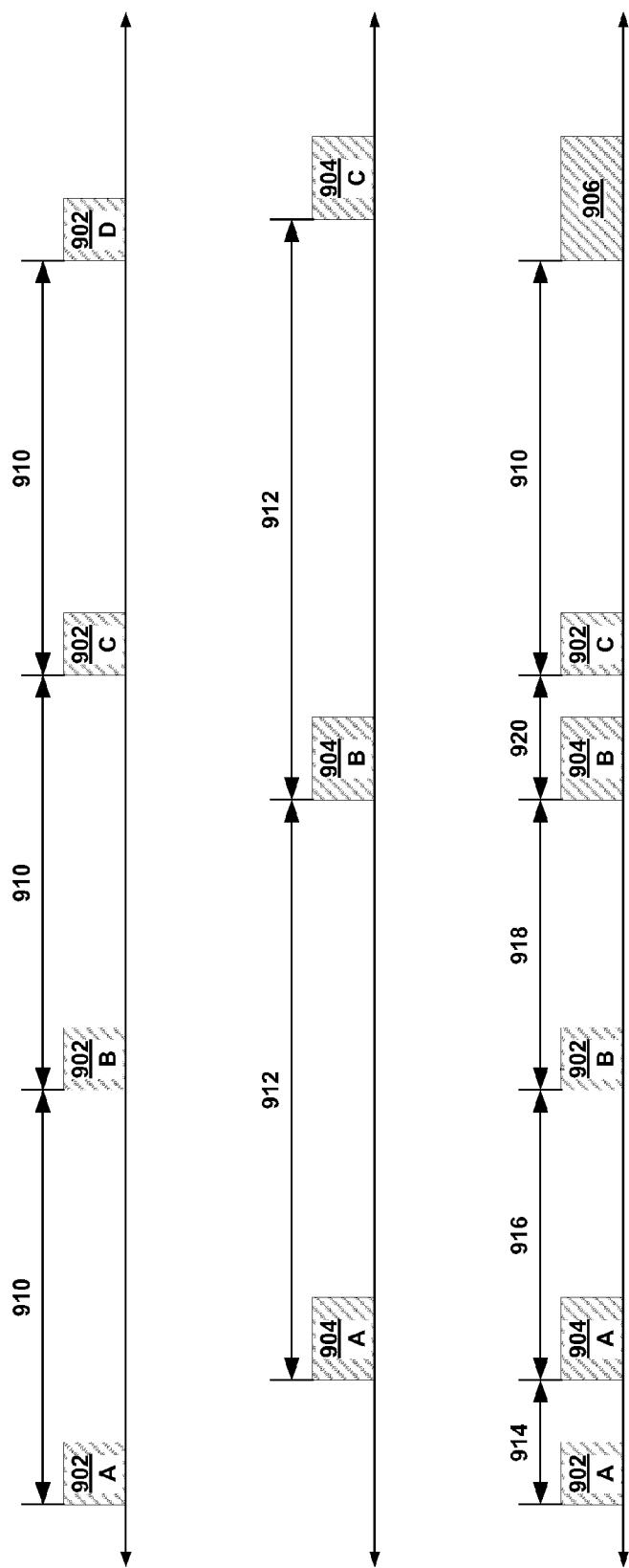
FIG. 9B illustrates the relationship between the maximum observed IAT and the period of the impulse noise source with the maximum frequency.

FIG. 9B shows the same combination of two periodic impulse noise sources as shown in FIG. 9A. Interval 910 shows the period for impulse noise source 902 on the top timeline. Interval 912 shows the period for impulse noise source 904 on the middle timeline. In this example, the frequency of impulse noise source 902 is greater than impulse noise source 904. It should be noted that when the two periodic noise sources are combined the IAT such as shown by intervals 914, 916, 918 and 920 on the bottom timeline are shorter than interval 910. From this example, it can be seen that the period of the maximum frequency impulse noise source cannot be greater than the maximum IAT observed. While it is possible to generate degenerate cases where the period of the maximum frequency impulse noise source does not register as an observed IAT, in practical circumstances the maximum IAT observed is at least a good approximation for the period of the maximum frequency impulse noise source and hence can be used to approximate the maximum frequency of the impulse noise sources.

Regarding the histogram INMAIAT, the resolution of the histogram INMAIAT is defined by the INMIATS parameter, which essentially defines the width in DMT symbols of the histogram bins, with $INMAIAT_7$ as the "overflow bin" which catches those IAT values which lie outside the resolution of the histogram INMAIAT. Clearly, if there are hits in the $INMAIAT_7$ histogram primitive, one cannot determine the maximum IAT but only deduce that the maximum IAT lays outside the resolution of the INMAIAT histogram. Also, clearly the smallest INMIATS setting would yield the most accurate determination for the maximum IAT value. Therefore, in order to obtain a more accurate analysis, it is desirable to find the optimal combination of INMIATO and INMIATS settings for which there is a zero hit count for $INMAIAT_7$, and it is also desirable that the parameter INMIATS is as small as possible to allow for the finest resolution while still maintaining a zero hit count for $INMAIAT_7$.

Figure 10:
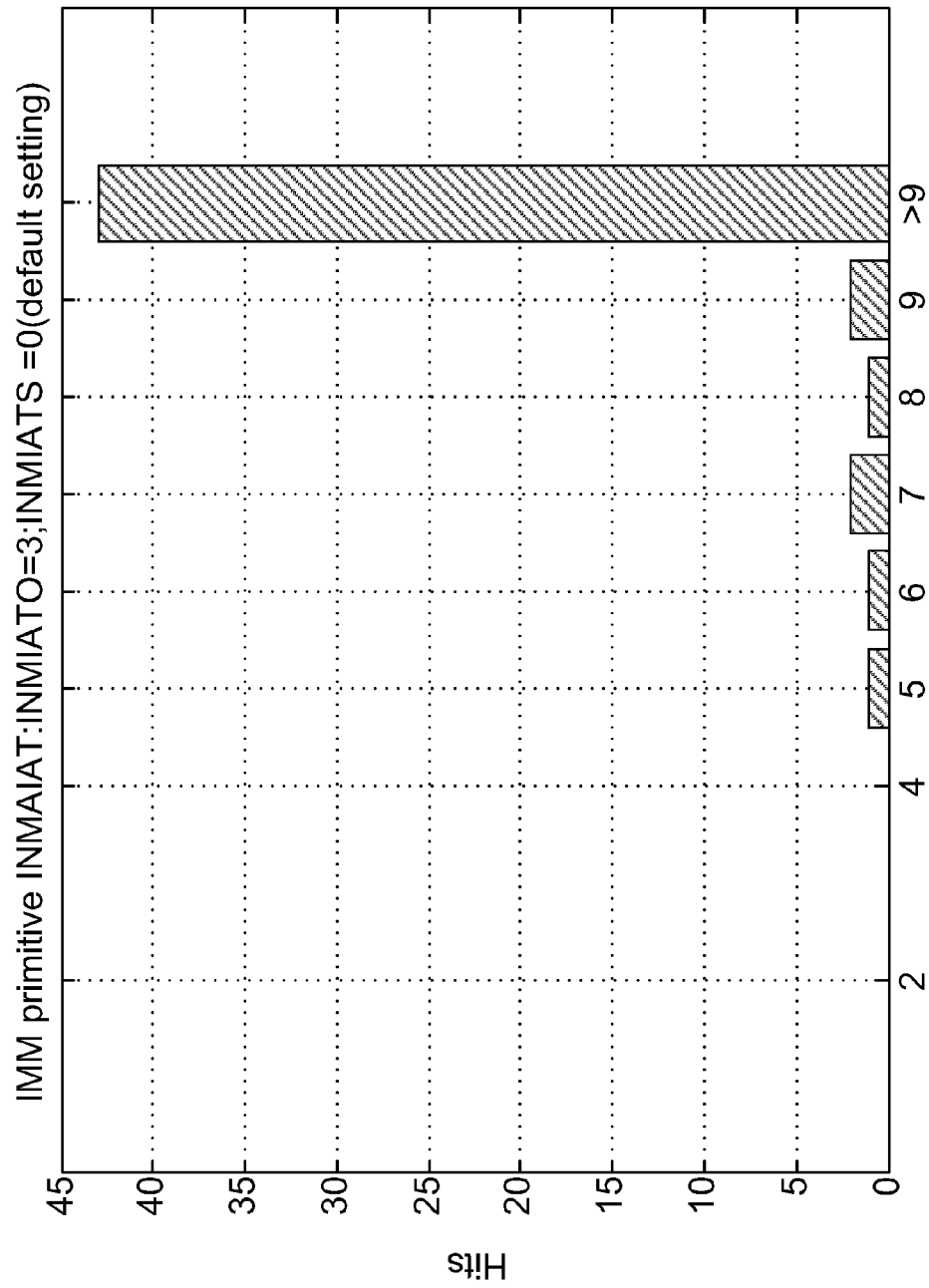
FIG. 10 shows the INMAIAT histogram when INMIATO is set to 3 and INMIATS is set to zero.

Using the example of 2 REIN sources of frequency 100 Hz and 120 Hz with impulse length of 3 and 4, respectively, FIG. 10 shows the INMAIAT histogram when INMIATO is set to 3 and INMIATS is set to zero, i.e., the default settings. In this case, the hit count for $INMAIAT_7$ representing IAT greater than 9 is non-zero. As mentioned above, this is undesirable for estimating the maximum frequency.

Figure 11:
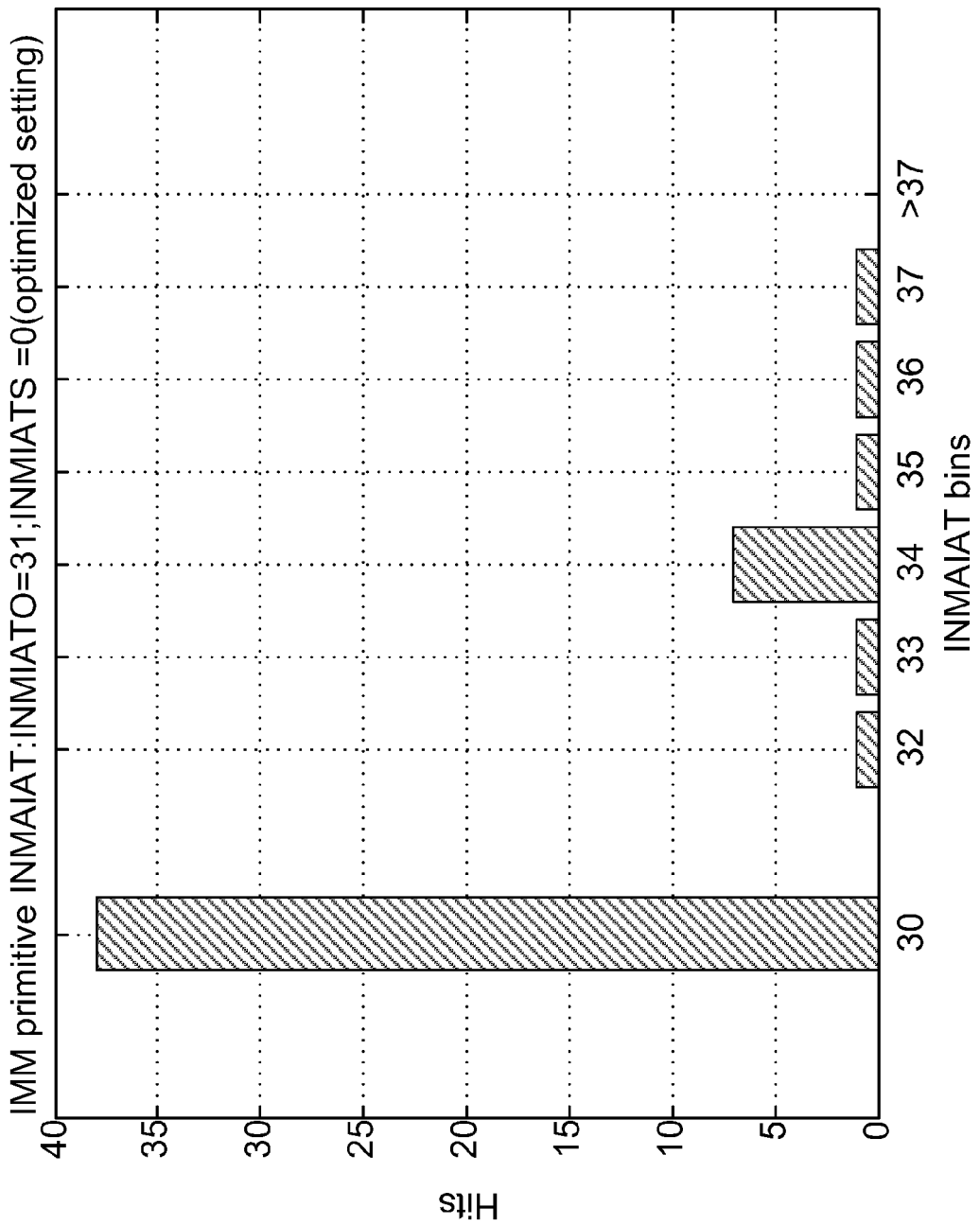
FIG. 11 shows the same impulse noise, but with different parameter settings used to generate the INMAIAT histogram.

FIG. 11 shows the same impulse noise, but with optimal parameter settings used to generate the INMAIAT histogram. In this example, there are no hits for $INMAIAT_7$ representing IAT greater than 37. Hence, this is a better suited histogram for analysis by IAT analysis engine 504.

Like the operation of the impulse length analysis engine, the IAT analysis engine performs analysis over an observation window, and the analysis is repeated after a shift by a fixed time interval. Specifically, the IAT analysis engine operates on the net change in the INMAIAT histogram during an observation window, by first performing cluster analysis and comparing the difference between the INMAIAT histogram at the beginning and at the end of the observation window, as calculated by standards based cluster analysis. After a predetermined duration, analysis is performed and finally the important data relating to impulse noise is extracted. The observation window is then shifted by a fixed time interval and the process can repeat. Like the impulse length analysis engine, it may be desirable for consecutive or even multiple observation windows to overlap. Furthermore, it is often desirable, but not necessary, for the size of the observation window and the fixed time interval used for the IAT analysis engine to be the same as that used for the impulse length analysis engine.

Figure 12:
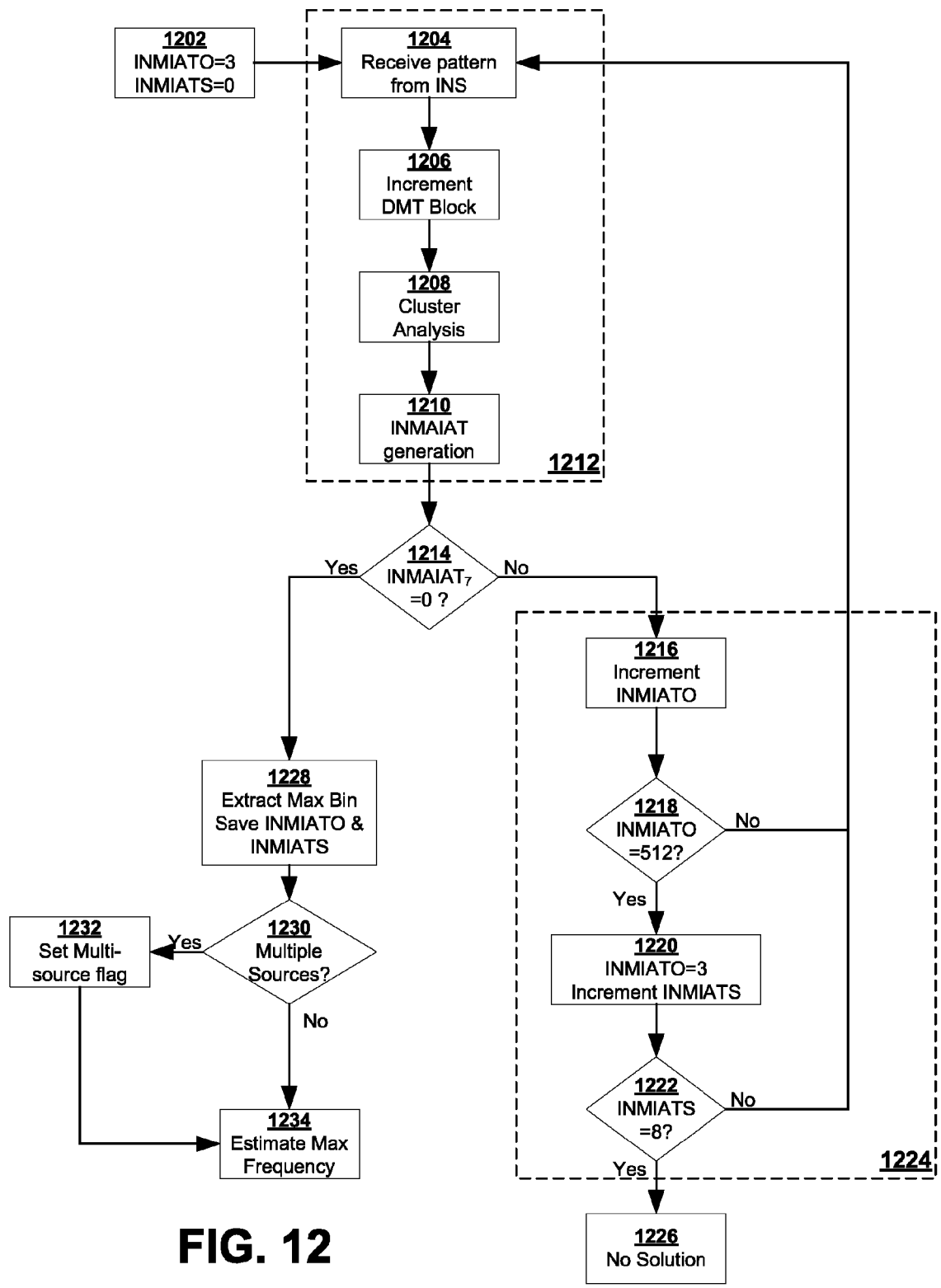
FIG. 12 is a flowchart illustrating the procedure performed by the IAT analysis engine.

FIG. 12 is a flowchart illustrating the procedure performed by IAT analysis engine 504. The process is initialized at step 1202 by setting INMIATO to the default value of 3 and by setting INMIATS to the default value of zero.

Sub-procedure 1212 generates the INMAIAT histogram based on the INMIATO and INMIATS parameters. Specifically, at step 1204 IAT analysis engine 504 receives the INM pattern from impulse noise sensor 422. At step 1206, IAT analysis engine 504 shifts the observation window by a fixed time interval. At step 1208, cluster analysis is performed based on predetermined parameters such as INCL, INCD, INCG, INP_EQ and INMAME and can be in accordance with the methods described in the standards (see Draft Amendment 2). At step 1210, the result of the cluster analysis and the parameters, INMIATO and INMIATS, the histogram INMAIAT are computed and also can be in accordance with the methods described in the standards.

At step 1214, IAT analysis engine 504 determines whether histogram bin $INMAIAT_7$ is zero. If it is non-zero, INMIATO and INMIATS are adjusted if possible by sub-procedure 1224. The process can then be repeated with new values for INMIATO and INMIATS after a predetermined duration. This predetermined duration depends on the range of the IN scenarios to be monitored. If $INMAIAT_7$ is zero, then the maximum histogram bin with a non-zero hit count is extracted at step 1228 and the values for INMIATO and INMIATS are saved for future use. The values for INMIATO and INMIATS could be saved as a starting point for a subsequent startup of the system.

At step 1230, the IAT analysis engine 504 determines whether there are multiple sources. Further, the existence of multiple impulse noise sources on the line can be found out by detecting the presence of non-zero hits distributed across the INMAIAT bins. If there is a single impulse noise source, it would be mapped to a single INMAIAT bin or at worst two adjacent INMAIAT bins if the impulse noise period is not an integral multiple of the DMT symbol duration when INMIATS=0. However, if there are two or more impulse noise sources on the line, their hit counts would be mapped to more than two INMAIAT bins according to a linear combination of the IAT value of individual impulse noise sources.

At step 1234 the maximum frequency of the impulse noise is estimated from the maximum histogram bin extracted in step 1230. From the maximum non-zero, non-overflow histogram bin, the maximum IAT can be obtained which approximates the period of the maximum frequency impulse noise source.

The adjustment of parameters performed in sub-procedure 1224 can be any sort of optimization search. In the embodiment shown in FIG. 12, the optimal values for INMIATO and INMIATS are found through a serial search. Specifically, at step 1216 INMIATO is incremented. If at step 1218 INMIATO is 512, the value of INMIATO is reset to zero in step 1220 and INMIATS is incremented at step 1220. Finally, if the value of INMIATS is 8, all legal combinations of INMIATO and INMIATS have been exhausted and there is no combination of INMIATO and INMIATS which leaves $INMAIAT_7$ with a value of zero. Hence, optionally, a state of "no solution" can be recorded at step 1226.

Figure 13:
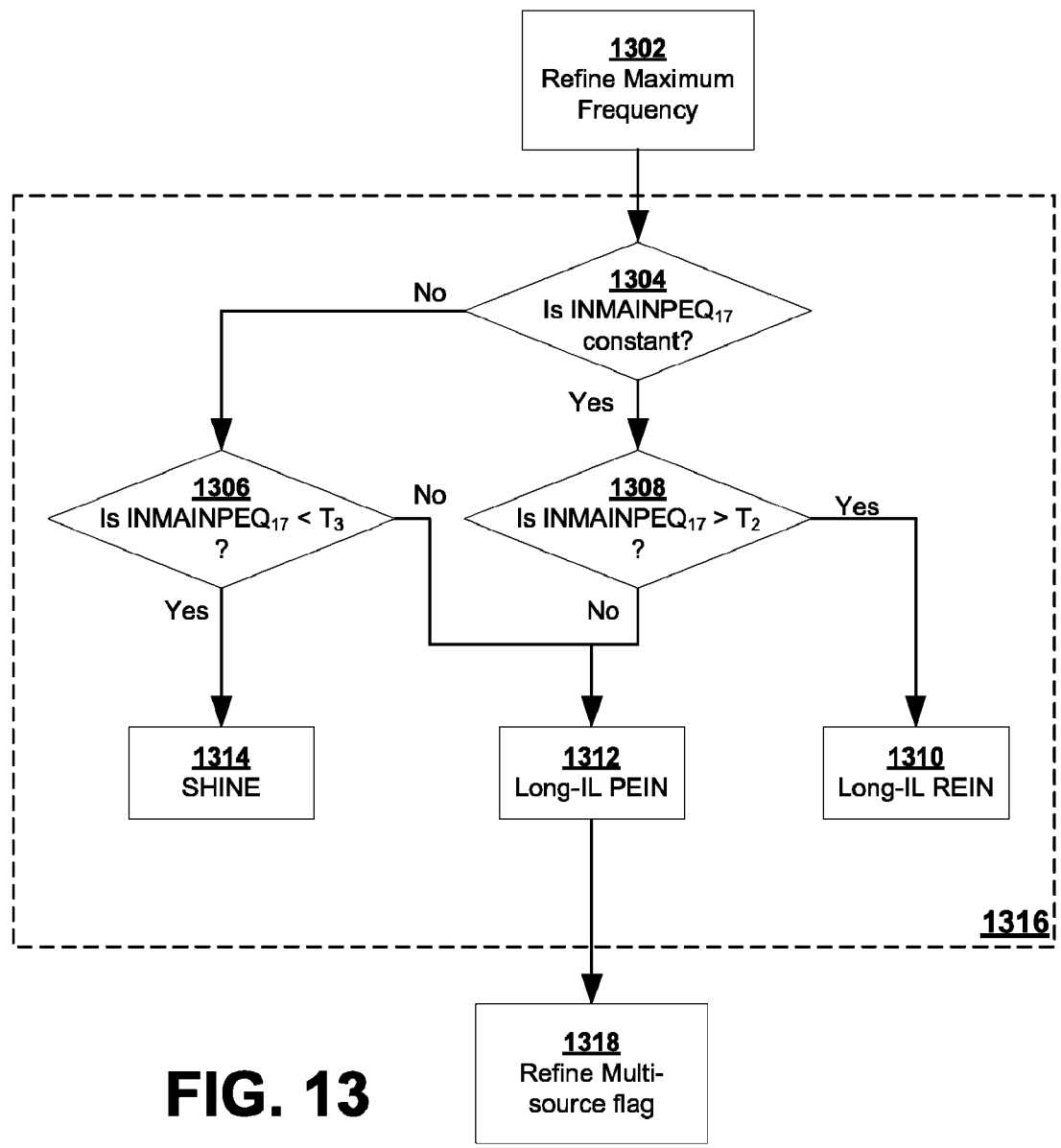
FIG. 13 is a flowchart illustrating the procedure performed by the combiner.

FIG. 13 is a flowchart illustrating the procedure performed by combiner 506. At step 1302, combiner 506 refines the maximum frequency value based on the maximum frequency received from IAT analysis engine 504 and the estimated IATs received from impulse length analysis engine 502. Specifically, the IATs received from impulse length analysis engine 502 can be converted to frequency, and the maximum of all frequency values derived from the IATs and the maximum frequency received from IAT analysis engine 504 results in the refined maximum frequency provided by combiner 506.

In sub-procedure 1316, combiner 506 further classifies the long impulse length sources by using the results of impulse length analysis engine 502 and IAT analysis engine 504 over one or more observation windows. Specifically, at step 1304, combiner 506 determines if the number of hits in INMAIN-PEQ$_{17}$ over multiple observation windows is constant. If so, then the presence of a long impulse length periodic source (REIN or PEIN) is confirmed. At step 1308, combiner 506 determines if the number of hits in INMAINPEQ$_{17}$ exceeds predetermined threshold T$_2$. If so, at step 1310 combiner 506 determines the presence of a long-IL periodic REIN source. If not, at step 1312, combiner 506 determines the presence of a long-IL periodic PEIN source. If at step 1304, INMAIN-PEQ$_{17}$ is determined not to be constant, combiner 506 determines whether INMAINPEQ$_{17}$ falls below predetermined threshold T$_3$. If not, combiner 506 determines the presence of a long-IL periodic PEIN source at step 1312. If so, combiner 506 determines at step 1314 the presence of SHINE or a periodic source with such a low frequency that the system is unable to distinguish it from SHINE. However, for all practical purposes, such noise sources with frequencies, e.g., less than 1 Hz, can be treated as non-periodic in any impulse noise mitigation system since the impulse noise occurs so infrequently.

At step 1318 combiner 506 refines the multi-source flag values received from impulse length analysis engine 502 and IAT analysis engine 504. Specifically, if impulse length analysis engine 502 indicates a multiple noise source flag and IAT analysis engine 504 indicates a multiple noise source flag, then combiner 506 issues a final multiple source flag. It should be noted that neither impulse length analysis engine 502 nor IAT analysis engine 504 are equipped to independently detect SHINE or a long-period impulse noise source. Detection of SHINE or a long-period impulse noise source is, however, possible in sub-procedure 1316 performed by combiner 506. If impulse length analysis engine 502 or IAT analysis engine 504 indicates a single periodic impulse noise source, and combiner 506 determines a SHINE or long-period impulse noise source, then combiner 506 issues a final multiple source flag.

It should be noted that once the IAT analysis engine has found optimal settings for the INMIATO and the INMIATS parameters, the impulse length analysis engine, the IAT analysis engine, the combiner can operate together producing real time INM statistics. In addition to providing a proper framework for the IAT engine to produce real time INM statistics, the optimal settings as well as the impulse noise statistics may also be read by the CO. In addition the impulse noise characterization engine carries out both short term and long term analysis. For example, determining the REIN frequency using short term analysis can optimize the tracking of various processing blocks such as the FEQ and timing recovery described above. In long term analysis, the maximum impulse length estimated by impulse noise characterization, as described above, can be used to re-tune the INP parameter INP_min used in impulse noise protection, which can be used to set the redundancy in the system such as a forward error correction code. The short term analysis provides all the INM statistics quickly so any dynamic changes in the impulse noise environment can be better tracked and used in real time to tune the INP features embedded in the DSL platforms, for appropriate protection. Additionally, over a long duration, the INM information can be used to protect against all the possible impulse noises in the field today by choosing the appropriate INP parameters.

FIG. 14 illustrates the performance of an exemplary impulse length analysis engine in estimating impulse length using the standard INM histogram INMAINPEQ. Here there are two REIN sources and one SHINE using a realistic INS, that is, a simulated INS which mimics the false alarms and mis-detections of a real INS such as that described above in the *Globecomm* 2008 reference. The impulse lengths for the REIN sources are 3 and 4 DMT symbols. The impulse length of the SHINE is 30 DMT symbols. The observation window is set to 40960 DMT symbols. The parameters were set as follows: INMCC=0, INP_EQ_MODE=0, INMIATO=39 and INMIATS=4. Each REIN source has frequencies ranging from 10 Hz to 200 Hz in increments of 10 Hz, e.g., one test might have REIN sources of 30 Hz and 150 Hz, respectively, and the other might have REIN sources of 40 Hz and 10 Hz, respectively. This yields a total of 400 test cases. In addition the relative offset of the first of each noise source is varied. The first column indicates the offset used in DMT symbols. The second column indicates the number of mis-identifications of the REIN sources out of the set of 400 test cases. Specifically, a mis-identification of a REIN source is when the impulse length of any REIN source is not properly classified. The third column indicates the percentage of test cases with incorrect results. Generally, the error rate is low with the exception of zero offset. This is likely accounted for when the two REIN sources exactly overlap and have the same frequency. It would be difficult and unnecessary to identify the two separate perfectly synchronized impulse noise sources should this occur in the field.

Figure 15:
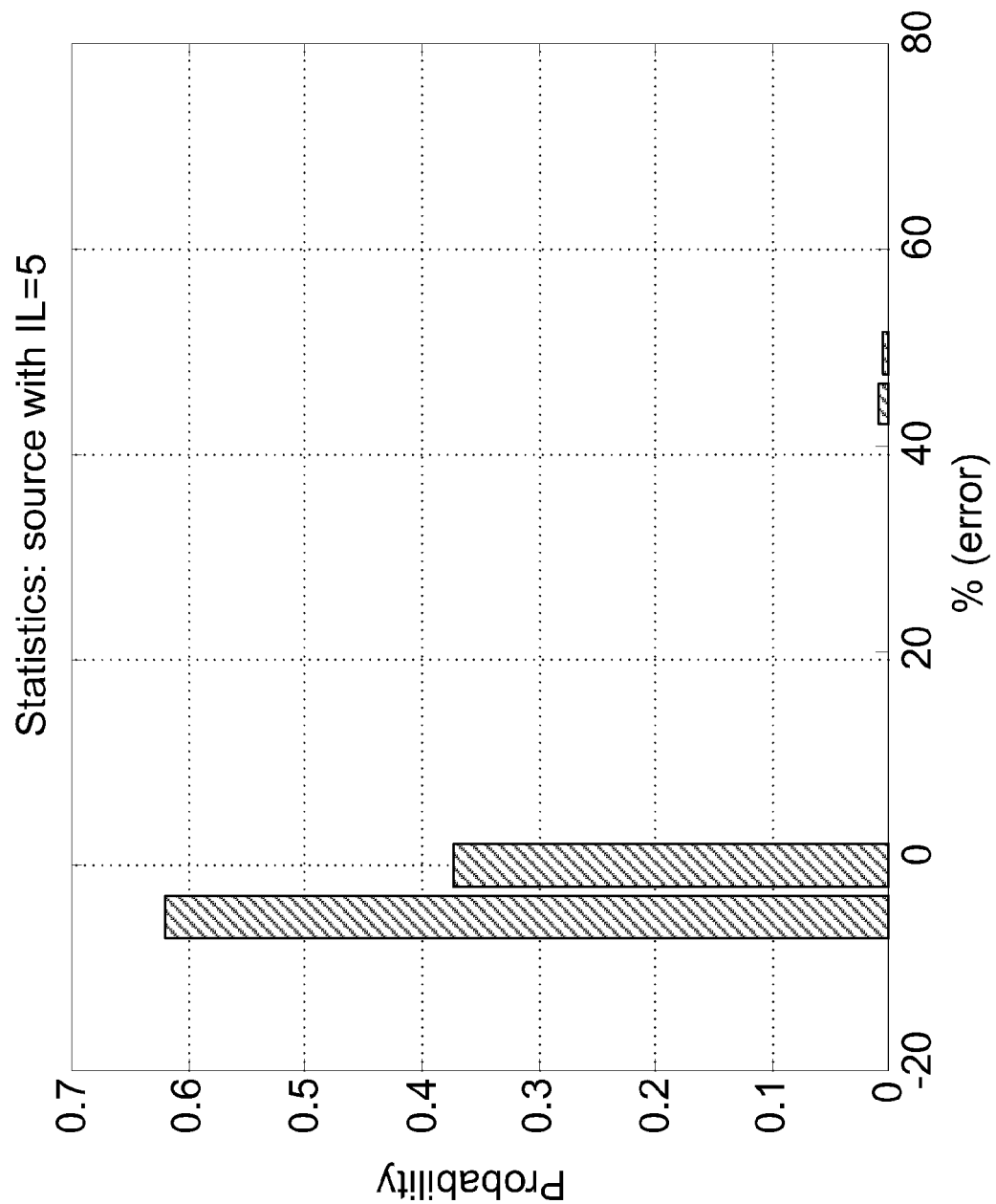
FIGS. 15 and 16 shows the performance of an exemplary impulse length analysis engine in estimating inter-arrival time in a test case having 2 REIN sources of impulse lengths 3 and 5 DMT symbols and a SHINE source of impulse length of 30 DMT symbols.
Figure 16:
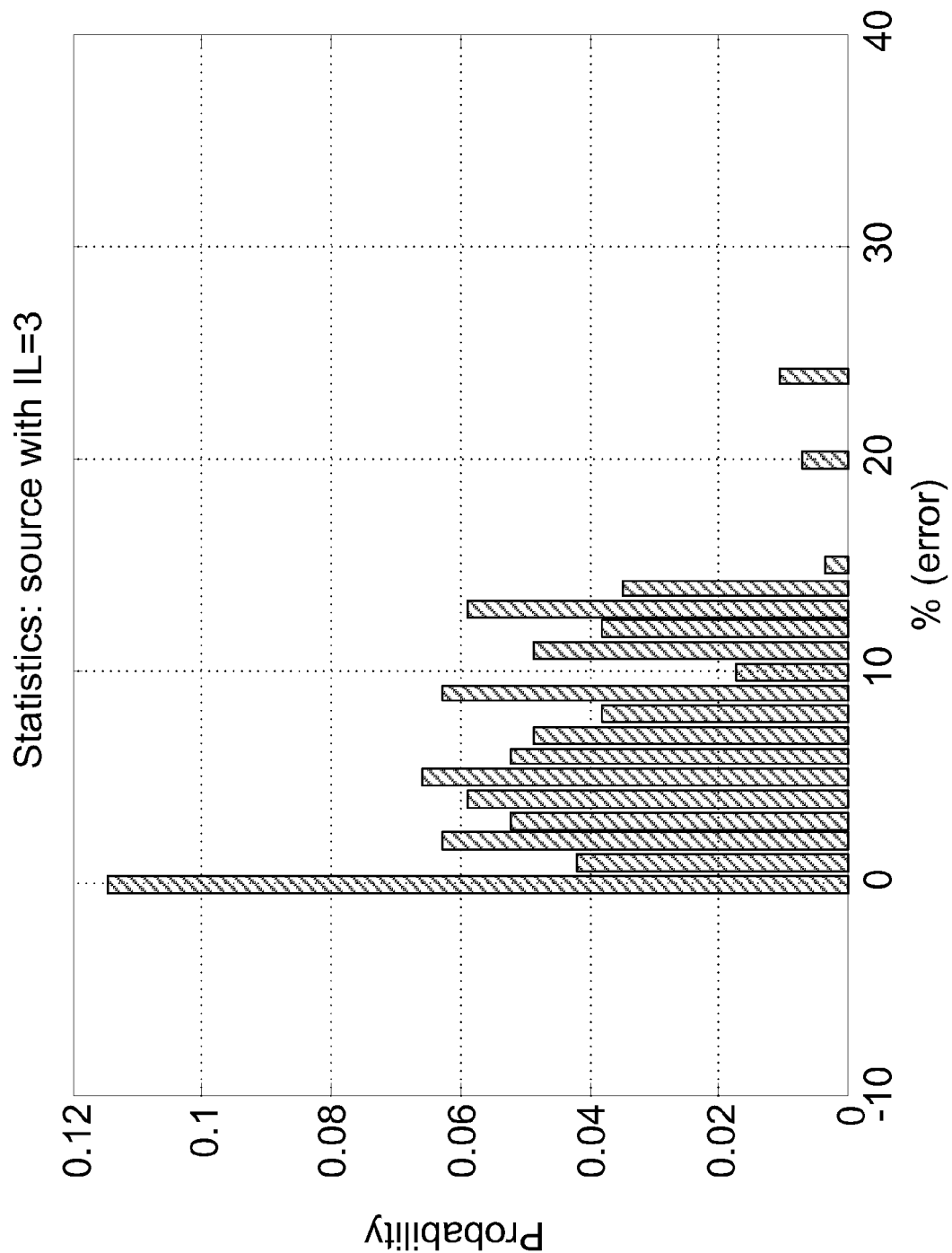

FIGS. 15 and 16 show the performance of an exemplary impulse length analysis engine in estimating inter-arrival time in a test case having 2 REIN sources of impulse lengths 3 and 5 DMT symbols and a SHINE source of impulse length of 30 DMT symbols. Again, each individual test has each REIN source with frequencies ranging from 10 Hz to 200 Hz in increments of 10 Hz with the cases of identical REIN frequencies excluded and with symmetric cases excluded to yield 288 individual tests. If a case has the first REIN sources with a first frequency and the second REIN source with a second frequency, the symmetric case would have the first REIN source with the second frequency and the second REIN source with the first frequency. The observation window is set to 40960 DMT symbols. Specifically, FIG. 15 shows the error distribution associated with determining the IAT of the REIN source having impulse length of 5 DMT symbols. FIG. 16 shows the error distribution associated with determining the IAT of the REIN source having impulse length of 3 DMT symbols. The percentage of the estimation error is calculated by taking the difference of the true value with the estimated value divided by the true value expressed as a percentage.

It is observed that the estimation performance of the impulse source with the highest impulse length is better than that of the impulse source with smaller impulse length. Further, the IAT of the impulse source with highest impulse length is overestimated in most cases and the IAT of the source with smaller impulse length tends to be underestimated.

Figure 17:
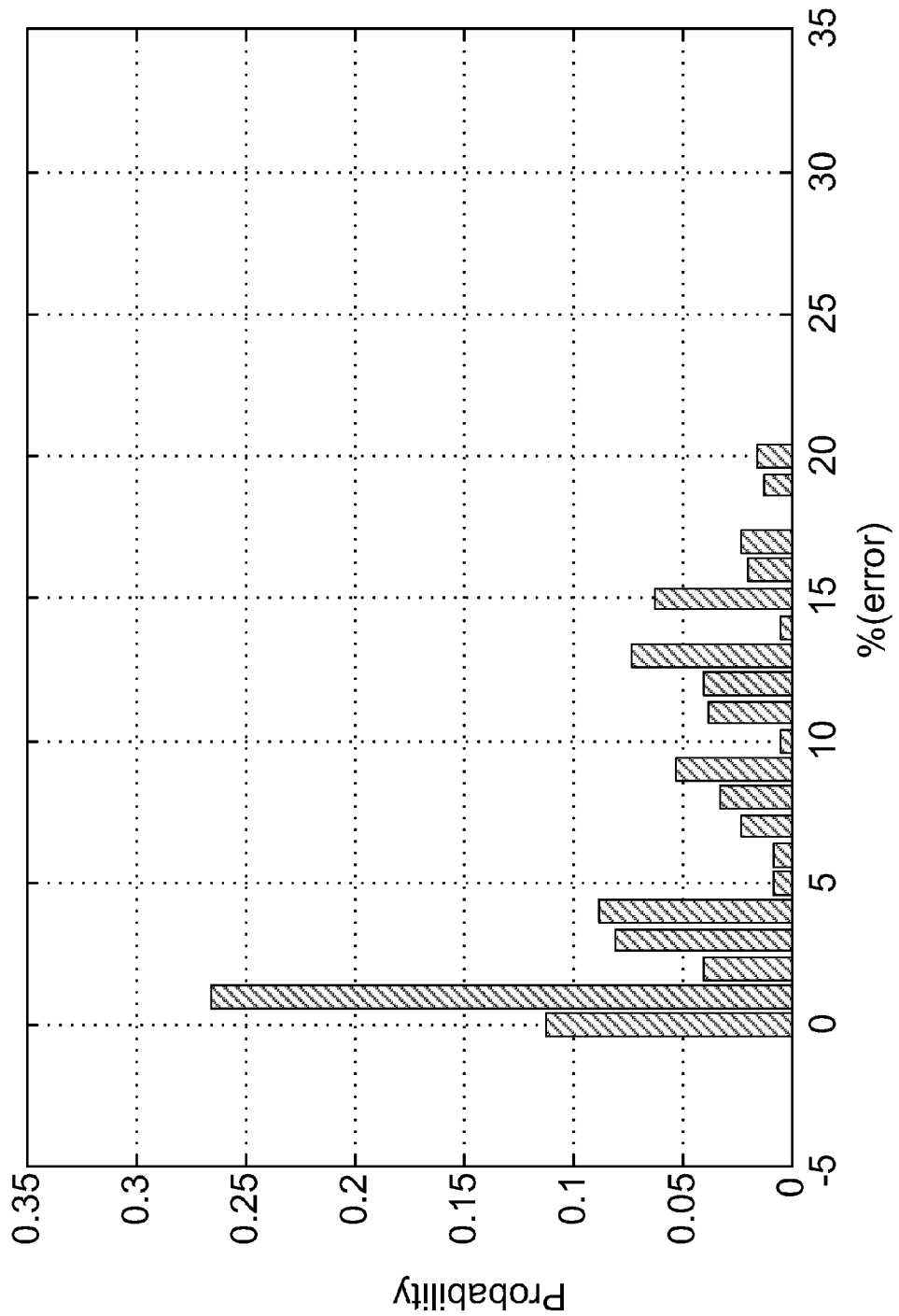
FIG. 17 shows performance of an exemplary IAT analysis engine in estimating the maximum frequency occurring on the line using the standard INM histogram INMAIAT based on the optimal tuning of the parameters INMIATO and INMIATS.

FIG. 17 shows performance of an exemplary IAT analysis engine in estimating the maximum frequency occurring on the line using the standard INM histogram INMAIAT based on the optimal tuning of the parameters INMIATO and INMI-ATS. The maximum frequency occurring in the line is underestimated in most cases. In this test case, there are two REIN sources. The impulse lengths for the REIN sources are 3 and 4 DMT symbols. The impulse length of the SHINE is 30 DMT symbols. The observation window is set to 409600 DMT symbols. Each REIN source has frequencies ranging from 10 Hz to 200 Hz in increments of 10 Hz, yielding 400 individual trials.

Figure 18:
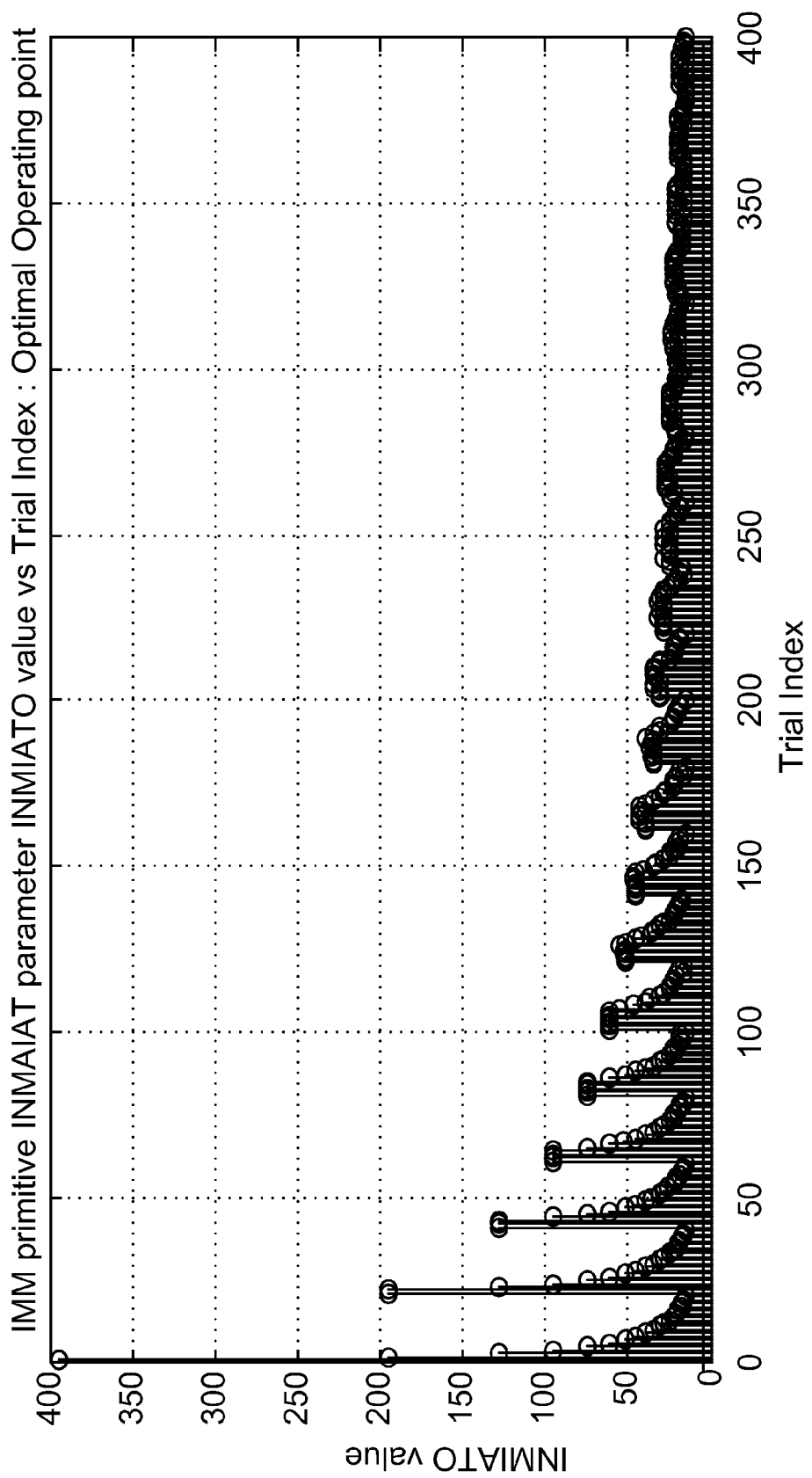
FIG. 18 shows the selected optimal value of INMIATO by an exemplary IAT analysis engine as a function of the trial index.

In the same test scenario as describe above, FIG. 18 shows the selected optimal value of INMIATO by an exemplary IAT analysis engine as a function of the trial index, which is a lexicographic ordering the REIN sources in steps of 10 Hz with the 4 DMT symbol length REIN source incremented first; that is, 10 Hz and 10 Hz is first, 20 Hz and 10 Hz is second until 200 Hz and 10 Hz, then comes 10 Hz and 20 Hz, etc. The initial trials represent the scenarios where the REIN sources have smaller frequencies, and a higher optimal value of INMIATO is obtained.

Figure 19:
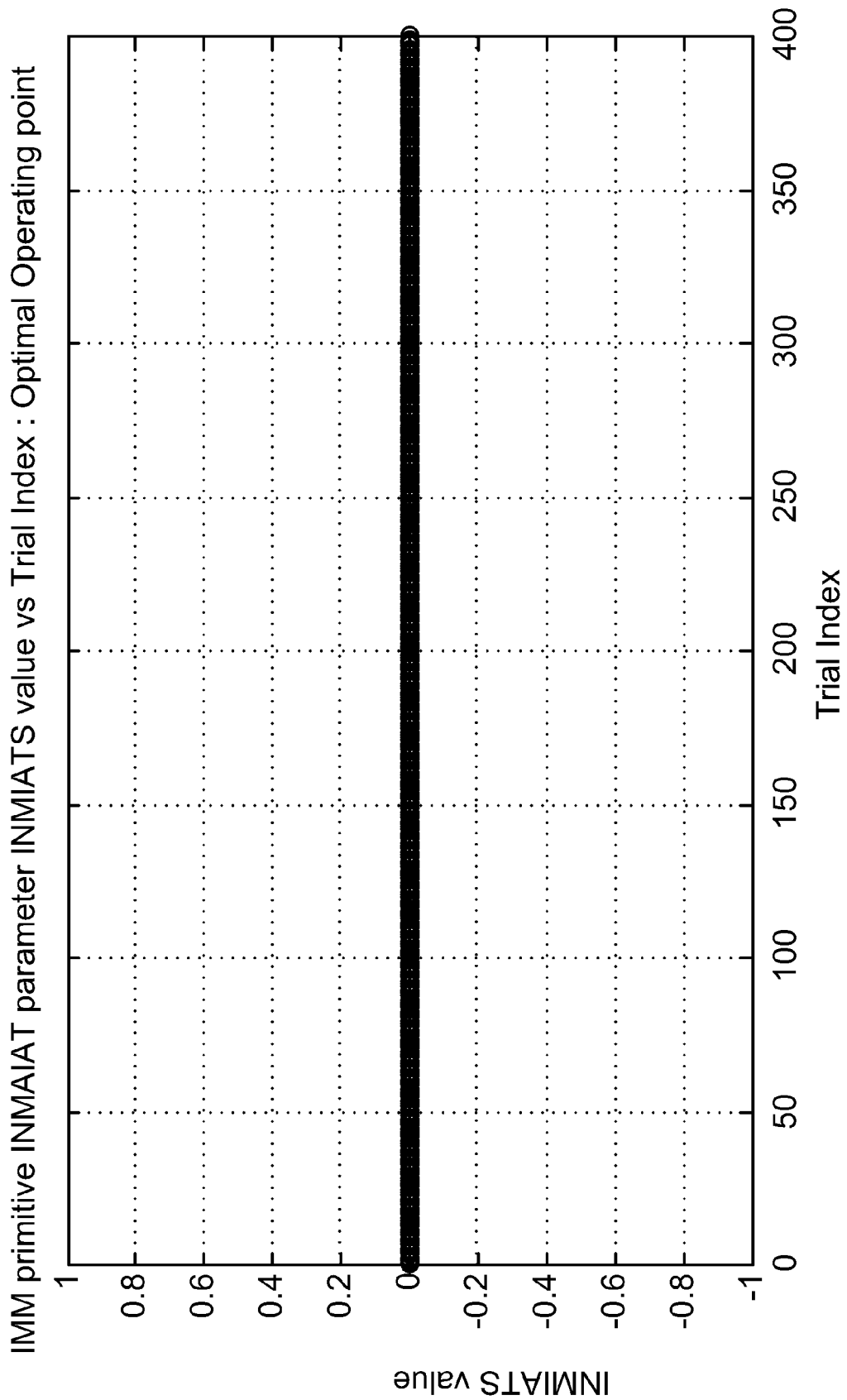
FIG. 19 shows the selected optimal value of INMIATS as a function of the trial index in the same scenario and trial index as in FIG. 18.

FIG. 19 shows the selected optimal value of INMIATS as a function of the trial index in the same scenario and trial index as in FIG. 18. For these specific impulse lengths, the optimal value of zero is selected for all REIN frequency combinations.

Figure 20:
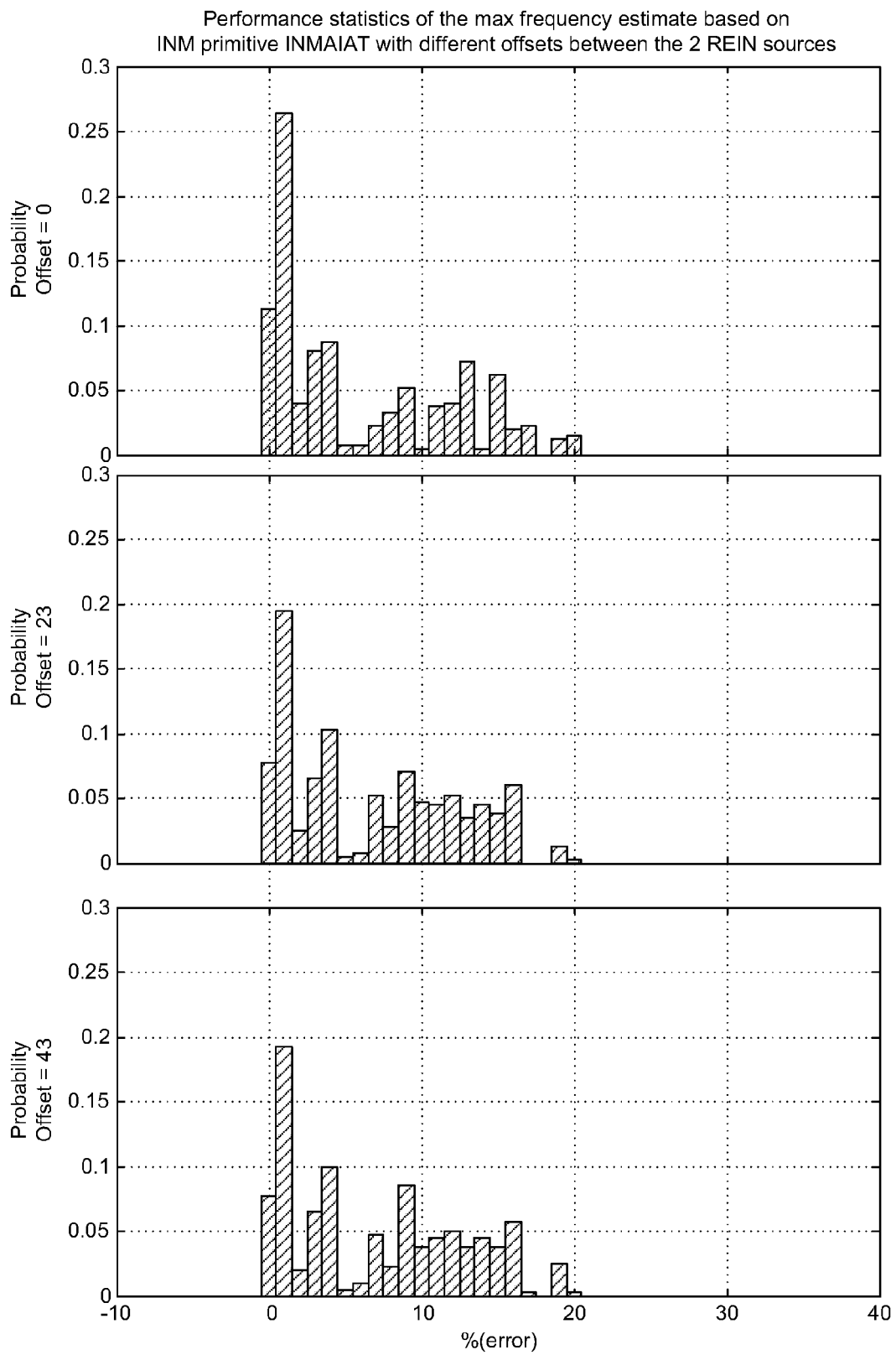
FIG. 20 shows the performance of the IAT analysis engine in estimating the maximum frequency occurring on the line using the histogram INMAIAT for various offsets between two REIN sources.

FIG. 20 shows the performance of the IAT analysis engine in estimating the maximum frequency occurring on the line using the histogram INMAIAT for various offsets between two REIN sources. The error distribution for the same test case as described for FIGS. 17-19 is used, but with three different offsets of 0, 23 and 43 DMT symbols between the two REIN sources. It can be see that the overall estimation performance is almost independent of the offset between the 2 REIN sources.

The impulse noise characterization system described herein processes the standard based INM histogram primitives and parameters and operates at the DMT symbol level. It estimates the impulse length and the IAT of each periodic impulse noise source on the line. This information can be used to refine the calculations of INP parameters (number of redundancy bytes R, interleaver depth D, etc and hence the MIB parameters INP_min and maximum delay delay_max), virtual noise specifications (Virtual noise PSD calculation), etc., which is required for robust operation of xDSL systems in the presence of impulse noise. In the simplest case, the maximum IL estimated by the Impulse noise Characterization engine can be used to determine the INP parameter INP_min. A more advanced scheme can use the REIN source frequency with occurrence time stamps to optimize the tracking of various signal processing blocks like FEQ and Timing recovery.

This information can also be used in a cognitive and universal impulse noise protection system such as that described in U.S. patent application entitled, "Cognitive and Universal Impulse Noise Protection", Ser. No. 12/348,763, filed on Jan. 5, 2009, which is hereby incorporated by reference in its entirety.

Figure 21A:
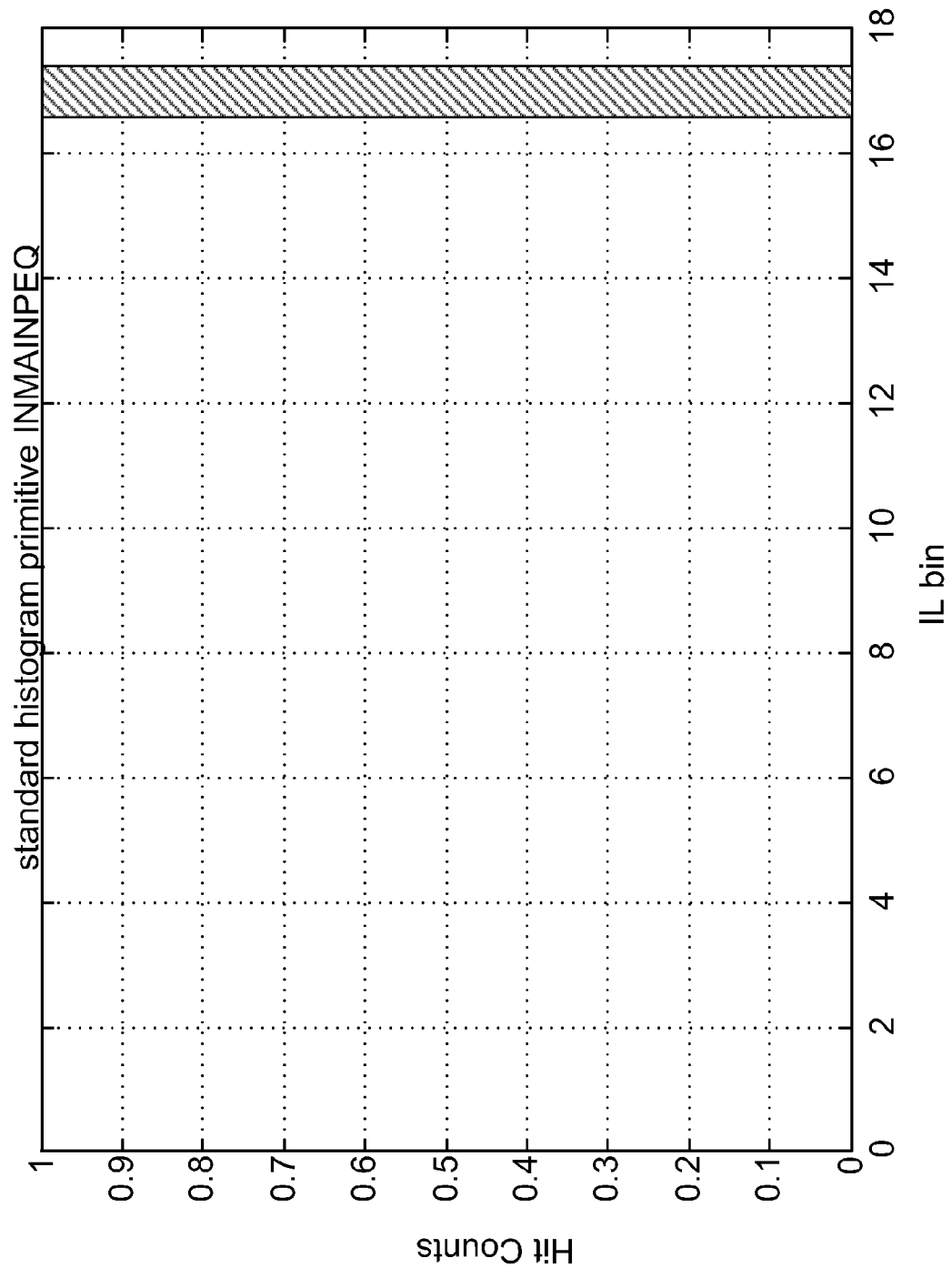
FIGS. 21A-21G show some additional results of the impulse noise characterization engine under simulation.
Figure 21B:
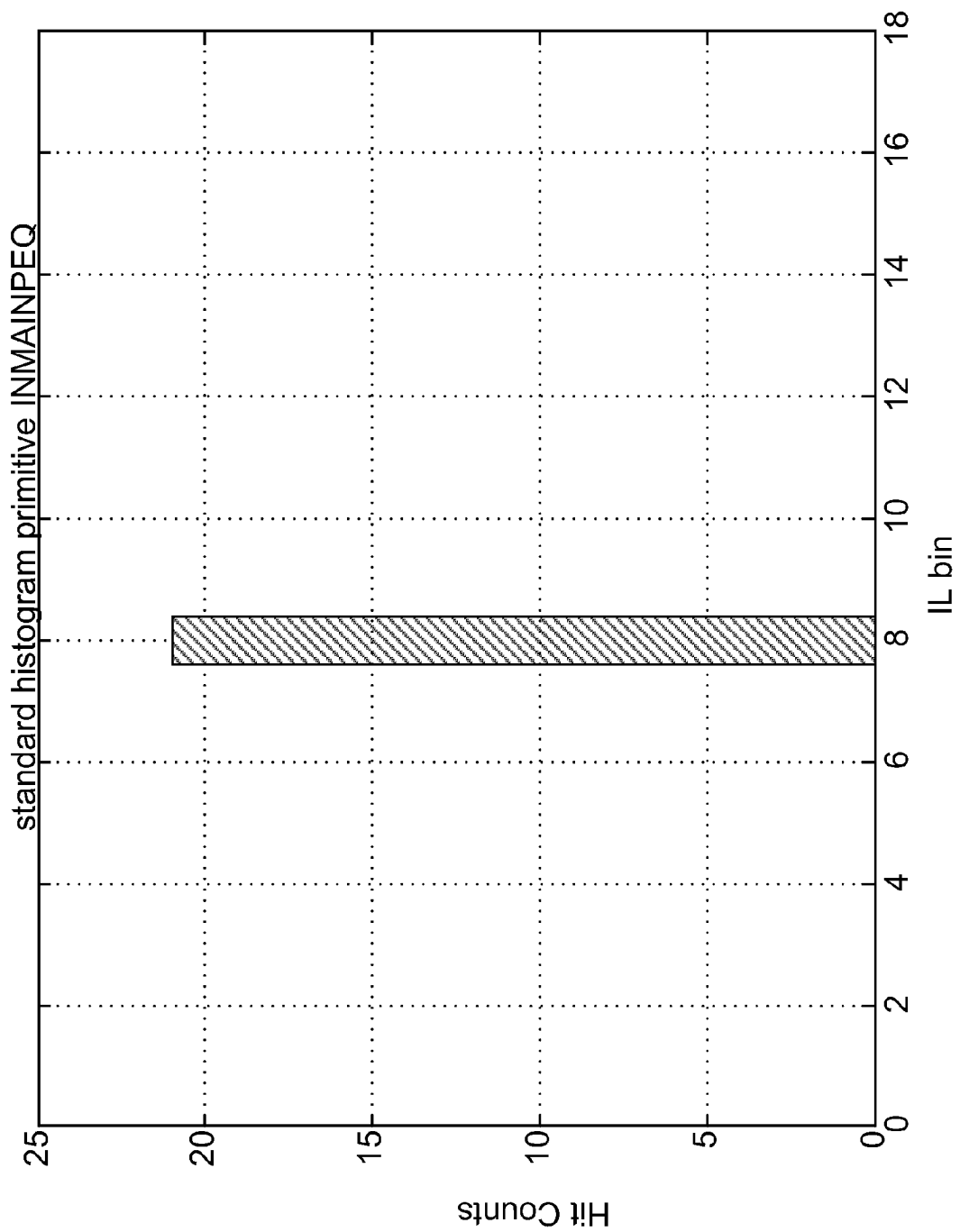
Figure 21C:
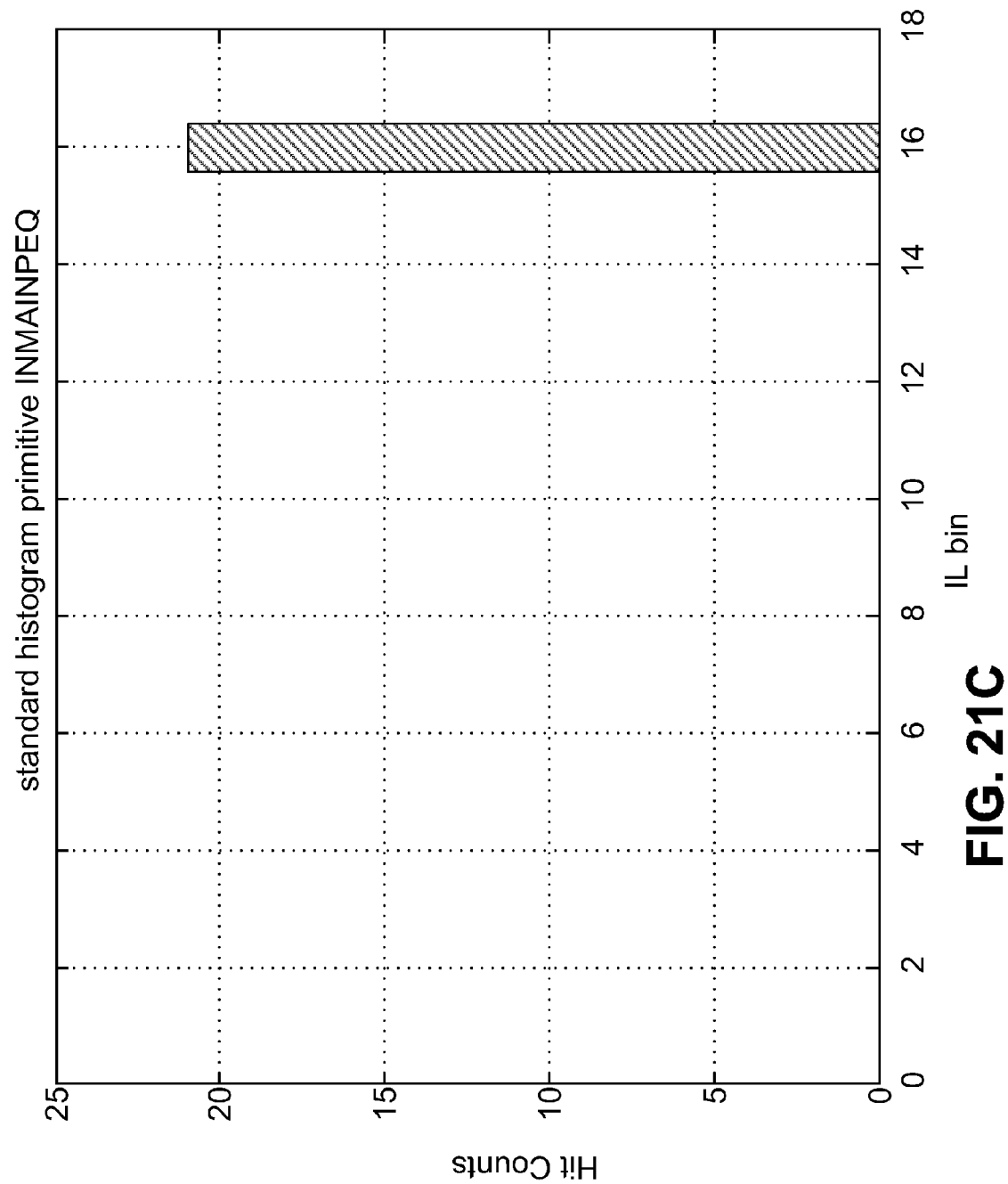
Figure 21D:
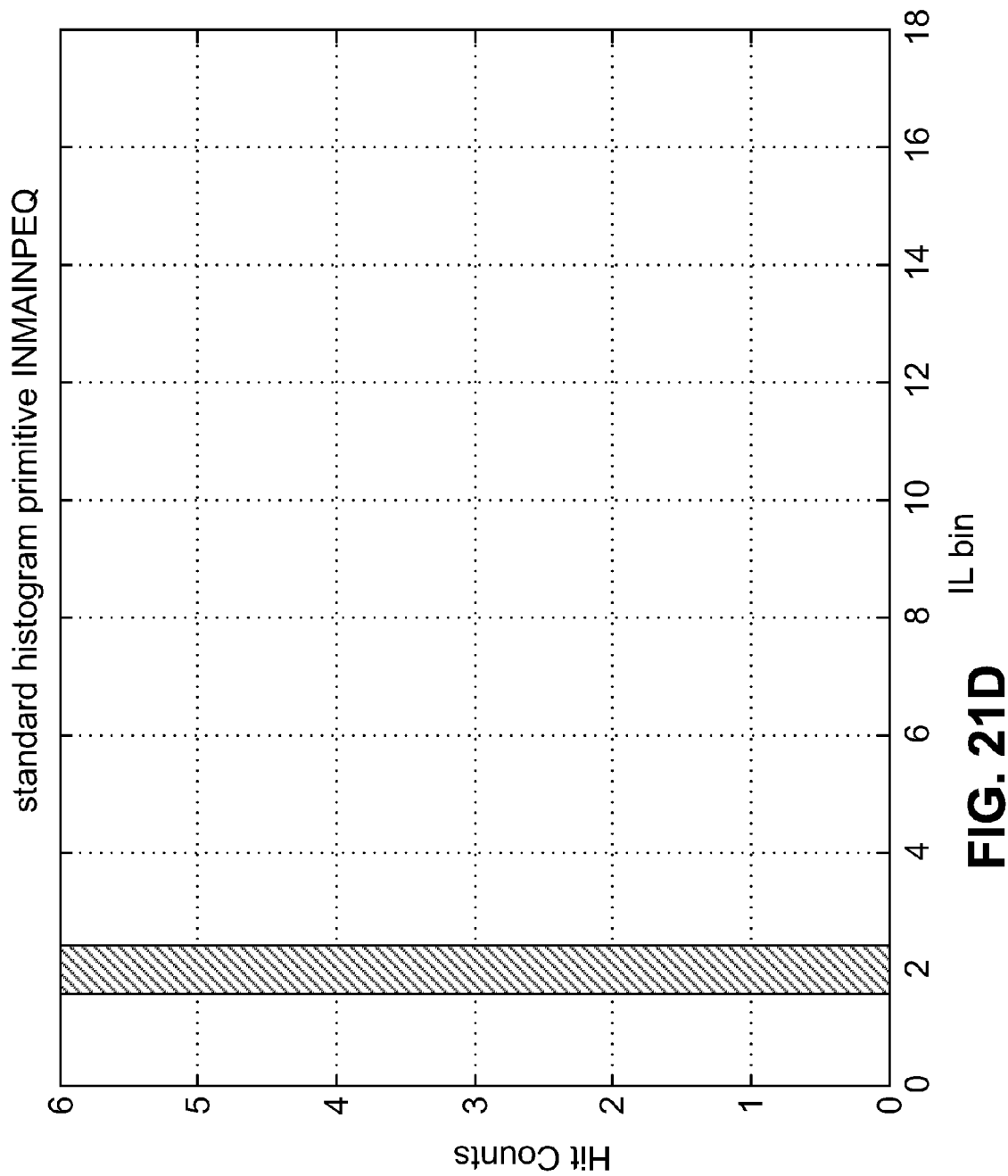
Figure 21E:
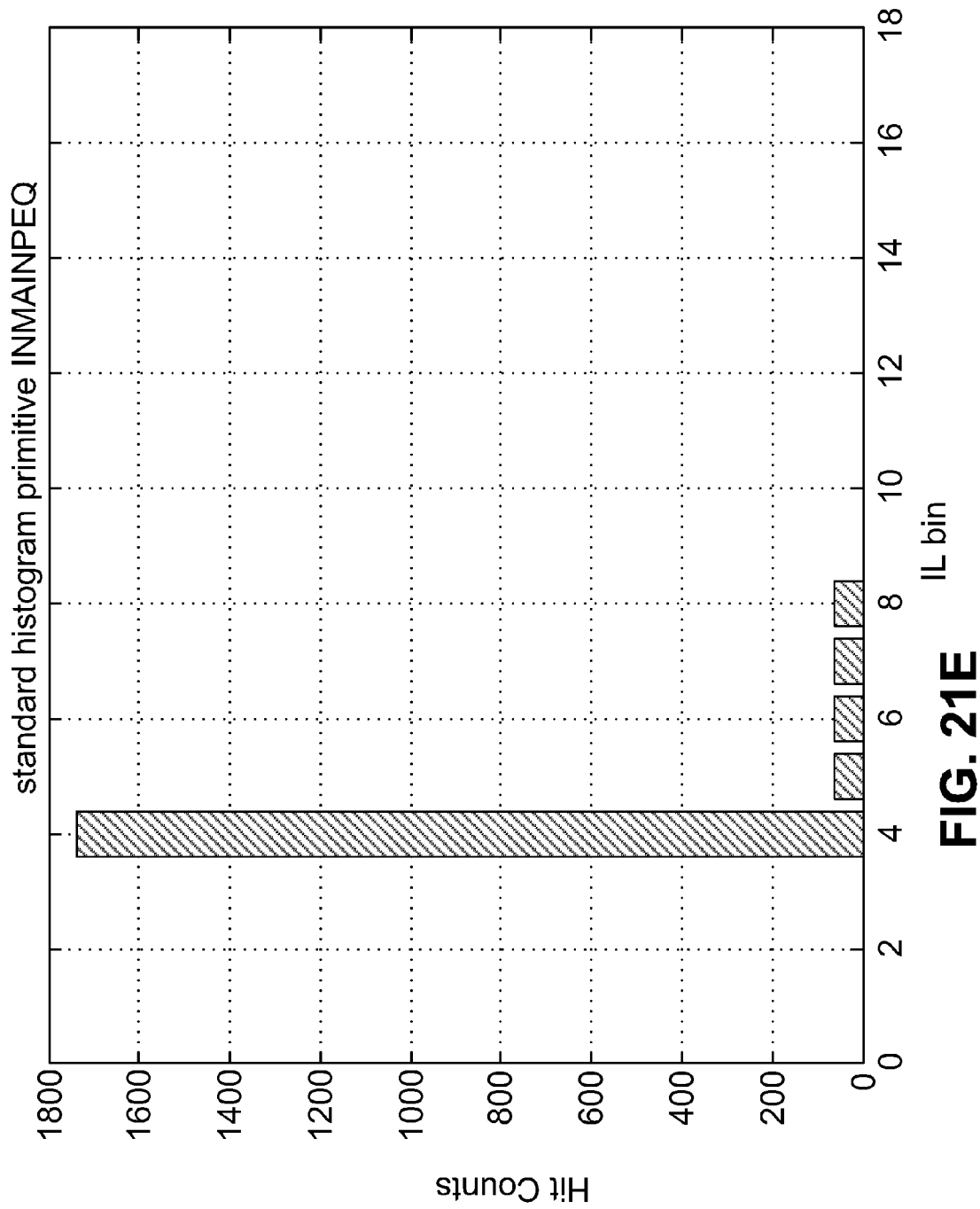
Figure 21F:
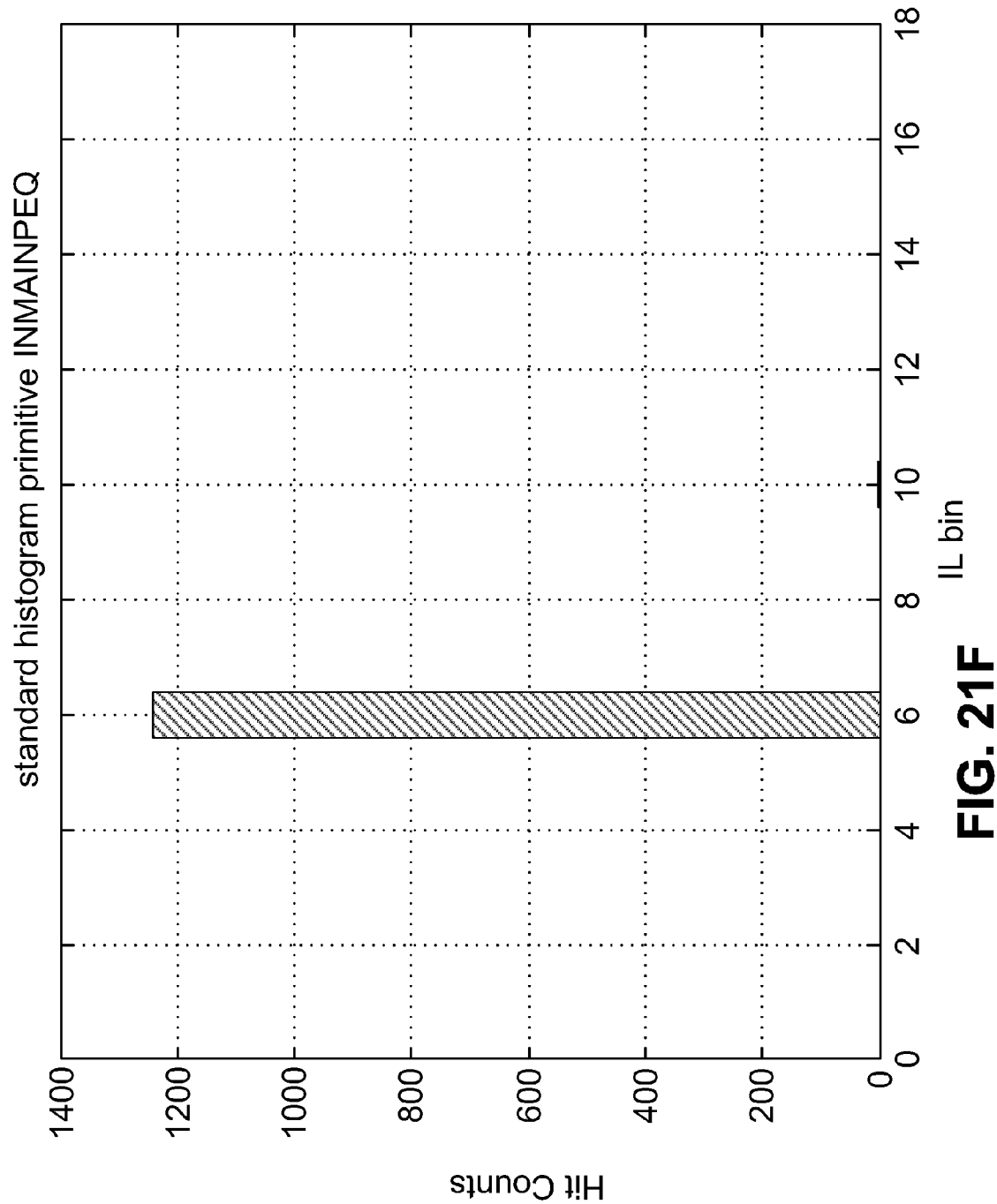
Figure 21G:
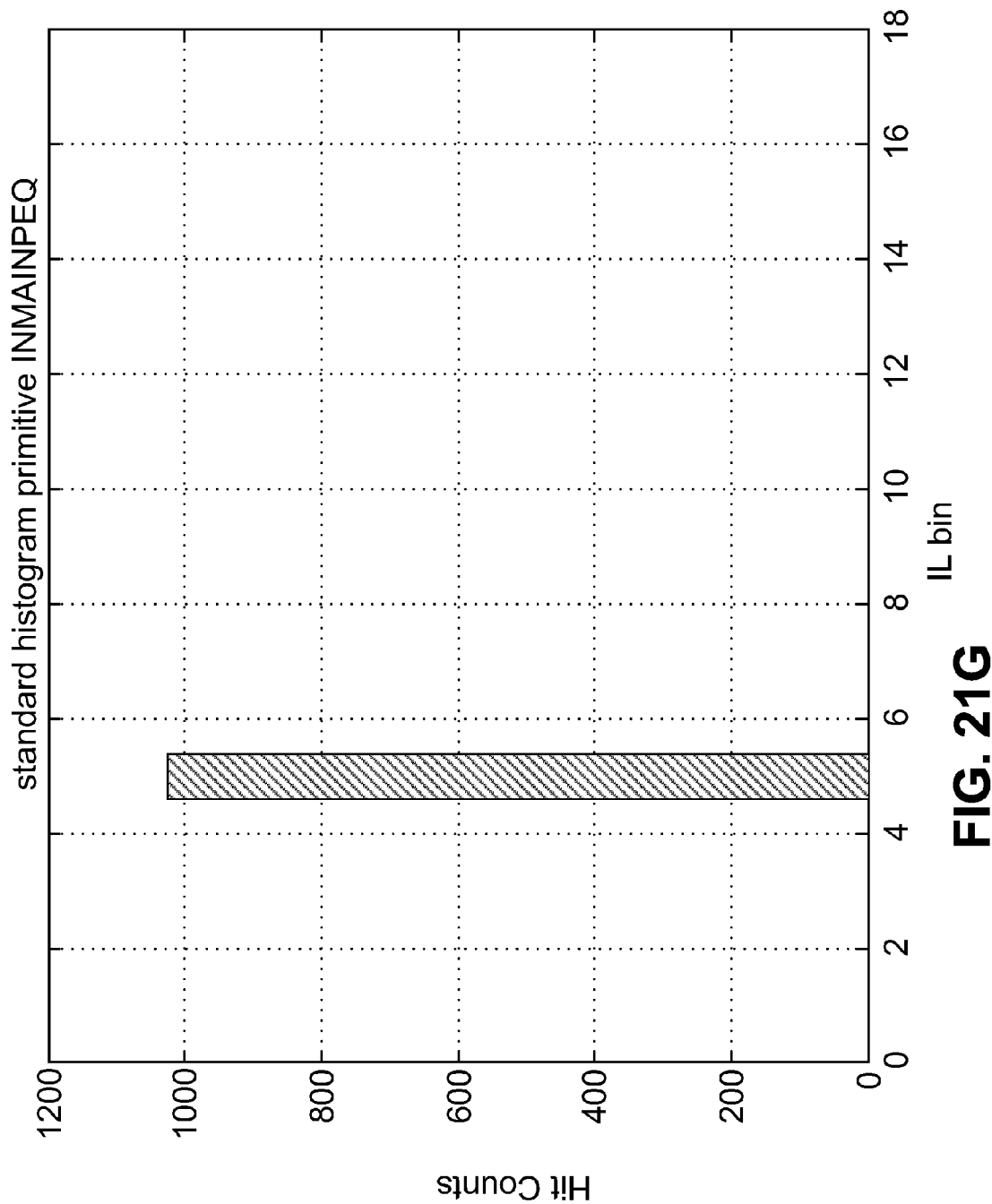

FIGS. 21A-21G show some additional results of the impulse noise characterization engine under simulation. All simulations were carried out with an observation window of 40960 DMT symbols which is approximately 10.24 seconds. Additionally, the specified parameters of INMCC and INP_EQ_MODE are both set to zero. FIG. 21A illustrates the INMAINPEQ histogram of a SHINE source with an impulse length of 64 DMT symbols. The impulse noise characterization engine estimates this as a non-periodic source with impulse length greater than 16 DMT symbols. FIG. 21B illustrates the INMAINPEQ histogram of a PEIN source with an impulse length of 8 DMT symbols and an IAT of 0.5 seconds. The impulse noise characterization engine estimates this as a periodic source with impulse length of 8 with a low frequency of about 2 Hz. FIG. 21C illustrates the INMAIN-PEQ histogram of a PEIN source with an impulse length of 16 DMT symbols and an IAT of 0.5 seconds. The impulse noise characterization engine estimates this as a periodic source with impulse length of 16 with a low frequency of about 2 Hz. FIG. 21D illustrates the INMAINPEQ histogram of a PEIN source with an impulse length of 2 DMT symbols and an IAT of 2 seconds. The impulse noise characterization engine estimates this as a periodic source with impulse length of 2 DMT symbols with a low frequency of about 0.5 Hz. FIG. 21E illustrates the INMAINPEQ histogram of two REIN sources with an impulse length of 4 DMT symbols each and IAT's of 10 ms and 8.3 ms. The impulse noise characterization engine estimates this as a periodic source with impulse length of 4 DMT symbols with a frequency of approximately 193 Hz. The impulse noise characterization engine also identifies the presence of more than one source on the line. FIG. 21F illustrates the INMAINPEQ histogram of a REIN source and a PEIN source with an impulse length of 6 DMT symbols each and inter-arrival times of 8.3 ms and 10 seconds, respectively. The impulse noise characterization engine estimates this as a periodic source with impulse length of 6 with a frequency of approximately 120 Hz. The impulse noise characterization engine also identifies the presence of more than one source on the line. FIG. 21G illustrates the INMAINPEQ histogram of a REIN source with a impulse length of 5 each and an IAT of 10 ms. The impulse noise characterization engine estimates this as a periodic source with an impulse length of 5 DMT symbols with a frequency of approximately 100 Hz.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. An impulse noise monitoring system comprising:

a hardware processor an impulse length analysis engine, executed by the hardware processor, wherein the impulse length analysis engine is configured to:

calculate a net INMAINPEQ histogram having histogram primitives INMAINPEQ$_i$ over an observation window, where i is taken from a range comprising integers from one to a specified value;

analyze the net INMAINPEQ histogram to determine whether the histogram primitive INMAINPEQ$_j$ is greater than a predetermined threshold and j is less than the specified value;

detect that a periodic impulse noise source of impulse length j is present if it is determined that the histogram primitive INMAINPEQ$_j$ is greater than the predetermined threshold;

analyze the net INMAINPEQ histogram to determine whether the histogram primitive INMAINPEQ$_m$ is greater than the predetermined threshold, where m is the specified value; and detect that a noise source of impulse length greater than the specified value is present if it is determined that the histogram primitive INMAINPEQ$_m$ is greater than the predetermined threshold.

2. The system of claim 1 wherein the impulse length analysis engine is further configured to:
   detect a false alarm from an impulse noise sensor (INS) by determining whether the histogram primitive $INMAINPEQ_1$ is non-zero and less than or equal to the predetermined threshold; and
   triggering a re-tune operation in the INS when a large number of false alarms are detected.

3. The system of claim 1 wherein the impulse length analysis engine is further configured to:
   determine a number of periodic impulse noise sources present; and
   indicate whether there are multiple impulse noise sources present based on the number of periodic impulse noise sources present.

4. The system of claim 1 wherein the impulse length analysis engine is further configured to:
   determine an overlap region due to impulse noise sources present.

5. The system of claim 4 wherein the overlap region comprises $INMAINPEQ_k$ wherein k ranges from a maximum length value, wherein the maximum length value is determined as the number one plus a maximum impulse length among all the impulse lengths of a plurality of impulse noise sources present, and where k ranges to a sum of all impulse lengths of the plurality of impulse noise sources.

6. The system of claim 5 wherein the impulse length analysis engine is further configured to:
   determine whether a non-classifiable impulse noise source is present by detecting histogram hits which are not in the overlap region and not greater than the predetermined threshold.

7. The system of claim 5 wherein the impulse length analysis engine is further configured to:
   determine the period of each periodic impulse noise source present from a plurality of histogram primitives that are greater than the predetermined threshold, and the overlap region, wherein the plurality of histogram primitives comprises $INMAINPEQ_i$, where i takes values from 1 to the specified value minus 1; and
   determine the frequencies of the impulse noise sources present from the period of each impulse noise source present.

8. An impulse noise monitoring system comprising;
   a hardware processor; and
   an inter-arrival time (IAT) engine, executed by the hardware processor, wherein the IAT analysis engine is configured to: calculate a net INMAIAT histogram having histogram primitives $INMAIAT_i$ over an observation window, for i=1 to a specified INMAIAT index, based on optimally selected INMIATO and INMIATS parameters, wherein INMIATO and INMIATS parameters are optimally selected by iteratively scanning values of INMIATO from 3 to 511 and INMIATS from 0 to 7 until the histogram primitive $INMAIAT_m$ is zero, where m is equal to the specified INMAIAT index.

9. The system of claim 8 wherein the optimally selected INMIATO and INMIATS parameters are selected such that INMIATO is the minimum value and INMIATS represents a maximum resolution where the histogram primitive $INMAIAT_m$ is zero, where m is equal to the specified INMAIAT index.

10. The system of claim 8 wherein the IAT analysis engine is further configured to:
    determine whether there are multiple periodic impulse noise sources present.

11. The system of claim 8 wherein the IAT analysis engine is further configured to:
    determine the maximum frequency of impulse noise sources present.

12. The system of claim 8 further comprising an impulse length analysis engine, wherein the impulse length analysis engine is configured to:
    calculate a net INMAINPEQ histogram having histogram primitives $INMAINPEQ_i$ over an observation window, where i is taken from a range comprising integers from one to a specified INMAINPEQ index;
    detect a periodic impulse noise source of impulse length j by determining whether the histogram primitive INMAINPEQj is greater than a first predetermined threshold and j is less than the specified INMAINPEQ index; and
    detect an impulse noise source of impulse length equal to or greater than the specified INMAINPEQ index by determining whether the histogram primitive $INMAINPEQ_m$ is greater than the first predetermined threshold where m is the specified INMAINPEQ index.

13. The system of claim 12 wherein the impulse length analysis engine is further configured to:
    detect a false alarm from an INS by determining whether the histogram primitive $INMAINPEQ_1$ is non-zero and less than to the first predetermined threshold.

14. The system of claim 12 wherein the impulse length analysis engine is further configured to:
    determine the number of periodic impulse noise sources present, and indicate whether there are multiple impulse noise sources present.

15. The system of claim 12 wherein the impulse length analysis engine is further configured to:
    determine an overlap region due to impulse noise sources present, wherein the overlap region comprises $INMAINPEQ_k$ wherein k ranges from a maximum length value, wherein the maximum length value is determined as the number one plus a maximum impulse length among all the impulse lengths of a plurality of impulse noise sources present, and where k ranges to a sum of all impulse lengths of the plurality of impulse noise sources;
    determine whether a non-classifiable impulse noise source is present by detecting histogram hits which are not in the overlap region and not greater than the first predetermined threshold;
    determine the period of each periodic impulse noise source present from a plurality of histogram primitives that are greater than the first predetermined threshold, and the overlap region, wherein the plurality of histogram primitives comprises $INMAINPEQ_i$, where i takes values from 1 to the specified INMAINPEQ index minus 1; and
    determine the frequencies of the impulse noise sources present from the period of each impulse noise source present.

16. The system of claim 12 further comprising a combiner wherein the combiner is configured to:
    determine whether a Long period repetitive electrical impulse noise (REIN) source, a Long period proLonged electrical impulse noise (PEIN) source or a single high impulse noise event (SHINE) source is present; and
    classify impulse noise sources present into types, wherein the types are selected from a group consisting of REIN, PEN and SHINE.

17. The system of claim 16 wherein the combiner is configured to:
  receive a plurality of frequencies representing periodic impulse noise sources present from the impulse length analysis engine;
  receive a maximum frequency of the impulse noise sources present from IAT analysis engine; and
  refine an estimate for a refined maximum frequency by determining the maximum among the plurality of frequencies and the maximum frequency.

18. The system of claim 16 wherein the combiner is configured to determine whether a Long period REIN source, a Long period PEIN source or a SHINE source is present by
  determining the presence of a Long period REIN source if a maximal INMAINPEQ histogram primitive is constant over multiple observation windows and the maximal histogram primitive exceeds a second predetermined threshold, where the maximal INMAINPEQ histogram primitive is $INMAINPEQ_k$ where k is the specified INMAINPEQ index;
  determining the presence of a Long period PEIN source if the maximal INMAINPEQ histogram primitive is constant over multiple observation windows and the maximal histogram primitive is less than or equal to the second predetermined threshold;
  determining the presence of a Long period PEIN source if the maximal INMAINPEQ histogram primitive is not constant over multiple observation windows and the maximal histogram primitive is greater than or equal to a third predetermined threshold; and
  determining the presence of a SHINE source if the maximal INMAINPEQ histogram primitive is not constant over multiple observation windows and the maximal histogram primitive is less than the third predetermined threshold.

19. The system of claim 16, wherein the combiner is further configured to
  receive first impulse noise statistics from the impulse length analysis engine, wherein the first impulse noise statistics comprise a first multi-source flag and a first indication of a single periodic source;
  receive second impulse noise statistics from the IAT analysis engine, wherein the second impulse noise statistics comprise a second multi-source flag and a second indication of a single periodic source; and
  determine whether multiple impulse noise sources are present on the line by indicating multiple sources are present if both the first multi-source flag is set and the second multi-source flag is set or if the first indication indicates a single periodic source or the second indication indicates a single periodic source and the combiner determines the presence of a Long period PEIN source, a Long period REIN source or a SHINE source.

20. A method for monitoring noise sources, comprising:
  calculating, by a hardware processor, a net INMAINPEQ histogram having histogram primitives $INMAINPEQ_i$ over an observation window, where i is taken from a range comprising integers from one to a specified INMAINPEQ index;
  analyzing the net INMAINPEQ histogram to determine whether the histogram primitive $INMAINPEQ_j$ is greater than a first predetermined threshold and j is less than the specified INMAINPEQ index;
  detecting that a periodic impulse noise source of impulse length j is present if it is determined that the histogram primitive $INMAINPEQ_j$ is greater than the first predetermined threshold;
  analyzing the net INMAINPEQ histogram to determine whether the histogram primitive $INMAINPEQ_m$ is greater than the first predetermined threshold where m is the specified INMAINPEQ index; and
  detecting an impulse noise source of impulse length greater than the specified INMAINPEQ index by determining whether the histogram primitive $INMAINPEQ_m$ is greater than the first predetermined threshold, where m is the specified INMAINPEQ index.

21. The method of claim 20 further comprising:
  determining the number of periodic impulse noise sources present, and indicating whether there are multiple impulse noise sources present;
  determining an overlap region due to impulse noise sources present;
  determining whether a non-classifiable impulse noise source is present comprising:
  detecting histogram hits which are not greater than the first predetermined threshold and not in the overlap region;
  determining the period of each periodic impulse noise source present from a plurality of histogram primitives that are greater than the first predetermined threshold, and the overlap region, wherein the plurality of histogram primitives comprises $INMAINPEQ_i$, where i takes values from 1 to the specified INMAINPEQ index minus 1; and
  determining the frequencies of the impulse noise sources present from the period of each impulse noise source present.

22. The method of claim 20 further comprising:
  detecting a false alarm from an INS by determining whether the histogram primitive $INMAINPEQ_1$ is non-zero and less than the first predetermined threshold.

23. The method of claim 20 further comprising:
  selecting optimal values for a INMIATO and a INMIATS parameters.

24. The method of claim 23 further comprising:
  calculating a net INMAIAT histogram having histogram primitives $INMAIAT_i$ over an observation window, for a specified INMAIAT index, based on optimally selected values for the INMIATO and the INMIATS parameters;
  determining whether there are multiple periodic impulse noise sources present based on the net INMAIAT histogram; and
  determining the maximum frequency of impulse noise sources present based on the net INMAIAT histogram.

25. The method of claim 24 comprising:
  determining whether a Long period REIN source, a Long period PEIN source or a SHINE source is present; and
  classifying impulse noise sources present into types, wherein the types are selected from a group consisting of REIN, PEIN and SHINE.

26. The method of claim 25 further comprising:
  determining the frequencies of the impulse noise sources present from the period of each impulse noise source present;
  refining an estimate for a refined maximum frequency by determining the maximum among the frequencies of the impulse noise sources present and a maximum frequency based on the net INMAIAT histogram; and
  determining whether multiple impulse noise sources are present.

27. An impulse noise monitoring system implemented by a computer, wherein the computer comprises:
- a means for analyzing impulse length;
- a means for analyzing IAT, wherein the means for analyzing IAT comprises:
  - a means for selecting optimal values for a INMIATO and a INMIATS parameters; and
  - a means for calculating a net INMAIAT histogram having histogram primitives $INMAIAT_i$ over an observation window, for i=1 to a specified INMAIAT index, based on optimally selected values for the INMIATO and the INMIATS parameters, wherein INMIATO and INMIATS parameters are optimally selected by iteratively scanning values of INMIATO from 3 to 511 and INMIATS from 0 to 7 until the histogram primitive $INMAIAT_m$ is zero, where m is equal to the specified INMAIAT index; and a means for combining results produced by the means for analyzing impulse length and the means for analyzing IAT.

28. The system of claim 27 wherein the means for analyzing IAT further comprises:
- a means for determining whether there are multiple periodic impulse noise sources present based on the net INMAIAT histogram; and
- a means for determining the maximum frequency of impulse noise sources present based on the net INMAIAT histogram.

29. The system of claim 27 wherein the means for analyzing impulse length comprises:
- a means for calculating a net INMAINPEQ histogram having histogram primitives $INMAINPEQ_i$ over an observation window, where i is taken from a range comprising integers from one to a specified INMAINPEQ index;
- a means for detecting a periodic impulse noise source of impulse length j by determining whether the histogram primitive $INMAINPEQ_j$ is greater than a first predetermined threshold and j is less than the specified INMAINPEQ index; and
- a means for detecting an impulse noise source of impulse length equal to or greater than the specified INMAINPEQ index by determining whether the histogram primitive $INMAINPEQ_m$ is greater than the first predetermined threshold where m is the specified INMAINPEQ index.

30. The system of claim 29 wherein the means for analyzing impulse length further comprises:
- a means for determining the number of periodic impulse noise sources present, and indicate whether there are multiple impulse noise sources present;
- a means for determining an overlap region due to impulse noise sources present;
- a means for determining whether a non-classifiable impulse noise source is present comprising:
- a means for detecting histogram hits which are not greater than the first predetermined threshold and not in the overlap region;
- a means for determining the period of each periodic impulse noise source present from a plurality of histogram primitives that are greater than the first predetermined threshold, and the overlap region, wherein the plurality of histogram primitives comprises $INMAINPEQ_i$, where i takes values from 1 to the specified INMAINPEQ index minus one;
- a means for determining the frequencies of the impulse noise sources present from the period of each impulse noise source present; and
- a means for detecting a false alarm from an INS by determining whether the histogram primitive $INMAINPEQ_1$ is non-zero and less than to the predetermined threshold.

31. The system of claim 27 wherein the means for combining results comprises:
- a means for determining whether a Long period REIN source, a Long period PEIN source or a SHINE source is present; and
- a means for classifying impulse noise sources present into types, wherein the types are selected from a group consisting of REIN, PEIN and SHINE.

32. The system of claim 31 wherein the means for combining results further comprises:
- a means for receiving a plurality of frequencies representing periodic impulse noise sources present from the means for analyzing impulse length;
- a means for receiving a maximum frequency of the impulse noise sources present from the means for analyzing IAT; and
- a means for refining an estimate for a refined maximum frequency by determining the maximum among the plurality of frequencies and the maximum frequency;
- a means for receiving first impulse noise statistics from the impulse length analysis engine;
- a means for receiving second impulse noise statistics from the IAT analysis engine; and
- a means for determining whether multiple impulse noise sources are present on the line.

* * * * *

UNITED STATES PATENT AND TRADEMARK OFFICE
CERTIFICATE OF CORRECTION

PATENT NO. : 8,396,688 B2
APPLICATION NO. : 12/348565
DATED : March 12, 2013
INVENTOR(S) : Samdani et al.

It is certified that error appears in the above-identified patent and that said Letters Patent is hereby corrected as shown below:

On the Title Page, Item (56), under "OTHER PUBLICATIONS", in Column 2, Line 4, delete "TF2" and insert -- TF2, --, therefor.

On Title Page 2, Item (56), under "OTHER PUBLICATIONS", in Column 2, Line 1, delete "al," and insert -- al., --, therefor.

On Title Page 2, Item (56), under "OTHER PUBLICATIONS", in Column 2, Line 8, delete "Issue 31, Oct.-Nov. 1994" and insert -- 31 Oct.- 2 Nov. 1994, --, therefor.

On Title Page 2, Item (56), under "OTHER PUBLICATIONS", in Column 2, Lines 11-12, delete "PCT/US09/55697." and insert -- PCT/US09/55697, --, therefor.

On Title Page 2, Item (56), under "OTHER PUBLICATIONS", in Column 2, Line 14, delete "Union)." and insert -- Union), --, therefor.

In the Specification:

In Column 5, Lines 65-66, delete "Issue, 31 Oct.-2 Nov. 1994 Page(s):50-54 vol. 1)" and insert -- 31 Oct.- 2 Nov. 1994, Page(s): 50-54) --, therefor.

In Column 7, Line 33, delete "shows performance" and insert -- shows the performance --, therefor.

In Column 18, Line 61, delete "shows performance" and insert -- shows the performance --, therefor.

In the Claims:

In Column 20, Line 42, in Claim 1, delete "processor" and insert -- processor; --, therefor.

In Column 21, Line 45, in Claim 8, delete "comprising;" and insert -- comprising: --, therefor.

Signed and Sealed this
Twenty-fourth Day of September, 2013

Teresa Stanek Rea
*Deputy Director of the United States Patent and Trademark Office*

In Column 22, Line 15, in Claim 12, delete "INMAINPEQj" and insert -- $INMAINPEQ_j$ --, therefor.

In Column 22, Line 61, in Claim 16, delete "Long" and insert -- long --, therefor at each occurrence throughout the claims.

In Column 22, Line 62, in Claim 16, delete "proLonged" and insert -- prolonged --, therefor.

In Column 22, Line 67, in Claim 16, delete "PEN" and insert -- PEIN --, therefor.

In Column 23, Line 37, in Claim 19, delete "to" and insert -- to: --, therefor.

In Column 24, Line 42, in Claim 24, delete "for a" and insert -- for i=1 to a --, therefor.